(12) United States Patent
Choi

(10) Patent No.: US 7,040,938 B2
(45) Date of Patent: May 9, 2006

(54) ARMORED FOLDAWAY INFLATABLE FLOATING DEVICE

(76) Inventor: Youn Sang Choi, 106-304, Youngjin Royal Apt., Pup-doug, Tuedeok-ku, Taejon (KR) 306-793

( * ) Notice: Subject to any disclaimer, the term of this patent is extended or adjusted under 35 U.S.C. 154(b) by 0 days.

(21) Appl. No.: 10/509,929

(22) PCT Filed: Apr. 2, 2003

(86) PCT No.: PCT/KR03/00656

§ 371 (c)(1),
(2), (4) Date: Oct. 1, 2004

(87) PCT Pub. No.: WO03/082616

PCT Pub. Date: Oct. 9, 2003

(65) Prior Publication Data
US 2005/0145157 A1    Jul. 7, 2005

(30) Foreign Application Priority Data

Apr. 2, 2002  (KR) ............... 10-2002-0017930
Sep. 7, 2002  (KR) ............... 10-2002-0054031
Apr. 1, 2003  (KR) ............... 10-2003-0020449

(51) Int. Cl.
*B60F 3/00*    (2006.01)
(52) U.S. Cl. ............... 440/12.5; 114/68; 114/283; 114/292; 114/360
(58) Field of Classification Search ............... 114/68, 114/283, 292, 360; 440/12.5, 12.56, 12.63, 440/12.64
See application file for complete search history.

(56) References Cited

U.S. PATENT DOCUMENTS

| | | | | | |
|---|---|---|---|---|---|
| 2,453,149 | A | * | 11/1948 | McCutchen | 114/9 |
| 2,514,488 | A | * | 7/1950 | Hale et al. | 440/12.56 |
| 2,981,221 | A | * | 4/1961 | Gillois et al. | 440/12.54 |
| 3,595,198 | A | * | 7/1971 | Hacker | 114/382 |
| 5,113,779 | A | * | 5/1992 | Amrein et al. | 440/12.63 |
| 6,820,566 | B1 | * | 11/2004 | Brown | 114/123 |
| 2002/0022415 | A1 | * | 2/2002 | Choi et al. | 440/12.5 |

FOREIGN PATENT DOCUMENTS

| DE | 25 21 672 | * 11/1975 |
|---|---|---|
| FR | 2 358 314 | * 3/1978 |
| GB | 1505511 | * 3/1978 |

* cited by examiner

*Primary Examiner*—Sherman Basinger
(74) *Attorney, Agent, or Firm*—Troxell Law Office, PLLC

(57) ABSTRACT

Disclosed is an AFIFD mounted on the front surface and both side surfaces of an amphibious vehicle to provide additional buoyancy. The AFIFD allows safe swimming of the amphibious vehicle, provides rapidity through automated folding and unfolding processes. The AFIFD has a membrane structure having a seal function and a plate structure having protection power, which are organically combined with each other, to provide both a seal function and protection power. The AFIFD is provided with air while being unfolded by the operation of driving means when the amphibious vehicle swims in water, so that the membrane structure and the plate structure are unfolded to form a completely sealed floating space. When the amphibious vehicle does not swim in water, the structures are folded and closed fixed to a vehicle body, so that the amphibious vehicle can run on ground without any difficulty.

13 Claims, 18 Drawing Sheets

Interior

ARMORED FOLDAWAY INFLATABLE FLOATING DEVICE

TECHNICAL FIELD

The present invention relates to a new armored foldaway inflatable floating device (hereinafter, called "AFIFD"), for providing additional buoyancy to an amphibious infantry fighting vehicle (hereinafter, called "amphibious vehicle") when the vehicle swims in water, and more particularly, to a new AFIFD, which can provide additional buoyancy for swimming by unfolding the AFIFD to form a hollow float space when the vehicle swims in water, and which can facilitate the running by folding the AFIFD when the vehicle runs on ground.

BACKGROUND ART

The present invention relates to a new AFIFD for providing buoyancy to an amphibious vehicle when the vehicle swims in water, and more particularly, to an AFIFD, which can provide buoyancy for swimming by unfolding the AFIFD to form a hollow float space when the vehicle swims in water, and which can facilitate the running by folding the AFIFD when the vehicle runs on ground.

A conventional amphibious vehicle have a great volume of a vehicle body and the total weight of the vehicle body lighter than the weight(namely, a water displacement amount) completely submerged into the water so as to float in water by buoyancy of water. About 70% or more of such amphibious vehicle is submerged into the water when the maximum loadable people or equipments are loaded on the amphibious vehicle.

However, if too thick armor plate is used to increase protection power or the vehicle weight exceeds the buoyancy due to loading of too heavy equipments such as heavy machine guns, the amphibious vehicle loses swimming ability at a development stage. When such non-amphibious vehicle goes across a river, the vehicle provides lowered fighting efficiency as it needs installation of a floating bridge.

To solve the above problem, auxiliary air bags or auxiliary floating screen are used to the vehicle body. However, the auxiliary floating devices need a long installation period of time as they must be installed manually, thereby considerably deteriorating countermeasure ability to serious combat situations. Furthermore, the auxiliary floating devices has weak stability and is short of abilities needed in the armored combat vehicle.

DISCLOSURE OF INVENTION

Accordingly, the present invention has been made in view of the above problems, and it is an object of the present invention to provide an AFIFD, which is installed on the outer side surface of an amphibious vehicle requiring additional floating power to provide additional buoyancy to the amphibious vehicle by unfolding the AFIFD when the amphibious vehicle swims in water, and which is mechanically folded and unfolded, thereby allowing independent swimming ability of the amphibious vehicle and providing speediness to the amphibious vehicle.

Another object of the present invention is to provide an AFIFD, which can maintain its buoyancy in spite of enemies' attack to maximize swimming efficiency and fighting power of the amphibious vehicle by making portions of the AFIFD, to be attacked, of armor materials.

A further object of the present invention is to provide an AFIFD, which can increase a loaded amount by increasing the maximum loading capacity of the amphibious vehicle as much as the floating ability of the AFIFD.

A still further object of the present invention is to provide an AFIFD, which can provide rapid folding and unfolding actions by preventing interference between an actuator and an driving means when the AFIFD is folded and unfolded in spite of the width of the outer armor plate 5 is longer and by securing a space for the driving means and preventing interference between the air bag and the driving means when the outer armor plate is folded to the inner plate.

Another object of the present invention is to provide an AFIFD, which can be unfolded in stable form by restricting the unfolding width of the outer armor plate to locate the outer armor plate at a right angle to the upper armor plate when the AFIFD is unfolded.

A further object of the present invention is to provide an AFIFD, which can be foldably and unfoldably mounted on the front surface of the amphibious vehicle to provide greater buoyancy to the amphibious vehicle.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, the AFIFD, which is a closed type AFIFD having the size suitable for the shape of an attaching surface (for example, both side surfaces of an amphibious vehicle) of an amphibious vehicle, includes the inner surface being in contact with a vehicle body, the top surface, the outer surface, the bottom surface, the front surface and the rear surface.

The top surface, the outer surface, the front surface and the rear surface, occasionally also the bottom surface, can be attacked during swimming. Therefore, it is preferable that the top surface, the outer surface, the front surface, the rear surface and the bottom surface must be made of protective materials, for example, durable and soft materials such as membranes used in rubber boats, but the others only have a sealing function.

To have a seal function and an easily foldable structure, it is necessary that also the front and rear surfaces have shields and plates for the protection power. Such sealed-type AFIFD is provided with air and unfolded for the swimming, and discharges the air and is folded and attached on the side surface of the vehicle body for ground-running. However, appropriate driving means are needed to smoothly fold and unfold the too heavy outer surface and the lower structure.

The foldable outer structure (and the lower structure) can be made of a one-piece plate, but it is preferable that it is manufactured in such a manner that several plates are collapsibly hinged and connected with one another for providing more smooth unfolding and inserting function and for providing elasticity.

Actuators are suitable as the driving means for unfolding the AFIFD, and it is the most effective to mount the actuator on the side wall of the vehicle body. For this, a wall closet-type connecting room is formed on a space to mount the actuators and extensible connectors protruding from the inner surface structure are attached so as to provide the same space as the inside of the AFIFD. Moreover, a device for connecting the driving device, the vehicle body and the AFIFD with one another, i.e., an actuator, a winch, an air supply line, a hydraulic pressure supply line, etc. can be mounted. The reason is to easily lift up the amphibious vehicle without disassembly of the AFIFD when a vehicle mechanic puts the lower part of the vehicle in good order. In lieu of the extensible connectors, a quick coupling may be applied to an inlet of the wall closet-type connecting room and a connector of the AFIFD, but it is somewhat complicated as they must be connected and removed whenever the AFIFD is folded and unfolded.

The AFIFD mounted in vehicle hull according to the present invention can facilitate the swimming of the amphibious vehicle, which is short of buoyancy, and increase loading efficiency as it provides additional buoyancy.

It is to be understood that both the foregoing general description and the following detailed description of the present invention are exemplary and explanatory and are intended to provide further explanation of the invention as claimed.

BRIEF DESCRIPTION OF DRAWINGS

Further objects and advantages of the invention can be more fully understood from the following detailed description taken in conjunction with the accompanying drawings in which:

FIG. 5b is a perspective view of a thimble-type rubber membrane shown by a doted line in FIG. 5a;

FIGS. 6a to 6d are sectional views showing an unfolding process of the AFIFD taken by the line A—A of FIG. 5a;

BEST MODE FOR CARRYING OUT THE INVENTION

Figure 1A:
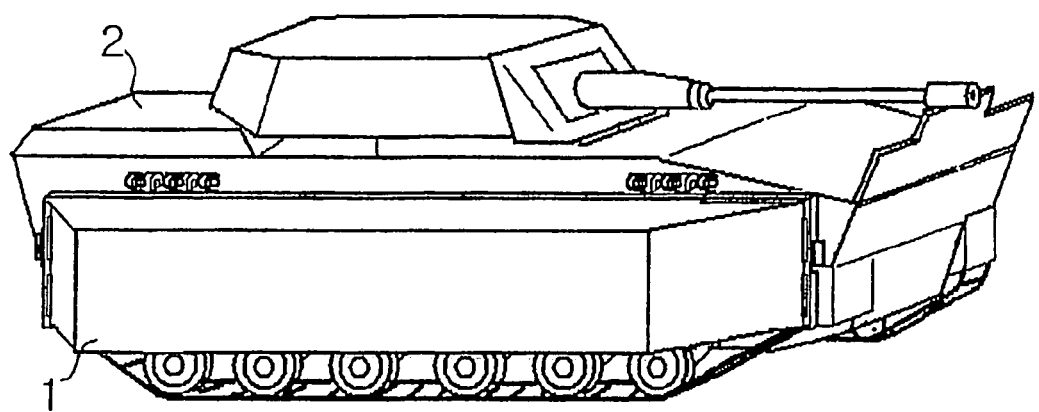
FIG. 1a is a perspective view showing a unfolded state of an AFIFD mounted on the side surface of an amphibious vehicle according to the present invention.

The present invention will now be described in detail in connection with preferred embodiments with reference to the accompanying drawings. For reference, like reference characters designate corresponding parts throughout several views.

Figure 1B:
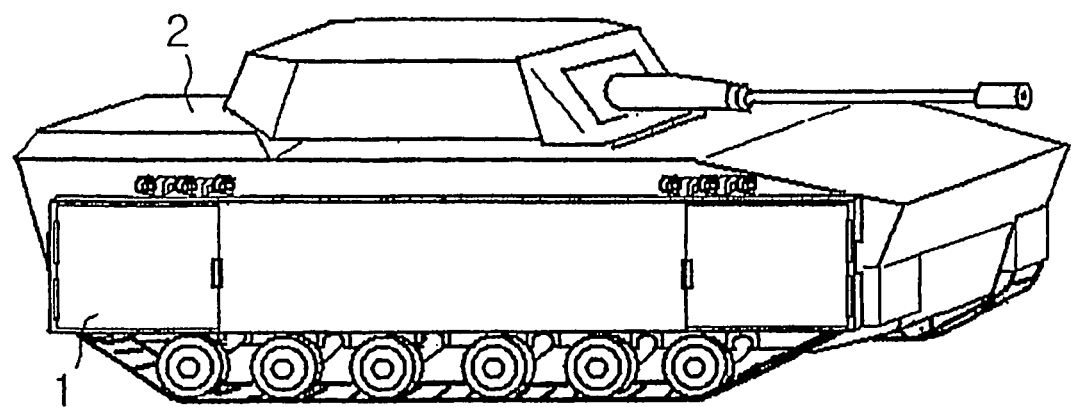
FIG. 1b is a perspective view showing a folded state of the AFIFD mounted on the side surface of the amphibious vehicle according to the present invention.

FIG. 1 shows an amphibious vehicle having an AFIFD according to the present invention, in which FIG. 1a is a perspective view showing an unfolded state of the AFIFD 1 for swimming of an amphibious vehicle, FIG. 1b is a perspective view showing a folded state of the AFIFD 1 during ground-running.

As shown in FIG. 1a, AFIFDs 1 are mounted on both sides of an amphibious vehicle 2, and respectively have floating spaces protruding from the whole length thereof. As the floating space of the AFIFD 1, which is formed on one side of the amphibious vehicle, is about 3~5 m³, the volume of the amphibious vehicle 2 is increased up to about 6~10 m³ by the both AFIFDs 1 when the amphibious vehicle 2 swims in water, and thereby, the amphibious vehicle 2 can obtain additional buoyancy corresponding to the increased volume and provide a safe swimming. As a result, the amphibious vehicle 2 can load more equipments or people of about 6~10 ton.

When the amphibious vehicle 2 reaches the ground after the swimming, as shown in FIG. 1b, the amphibious vehicle 2 can run on the ground without any difficulty as the AFIFDs 1 are folded and closely contacted to the side walls of a vehicle body.

EMBODIMENT 1

Figure 2A:
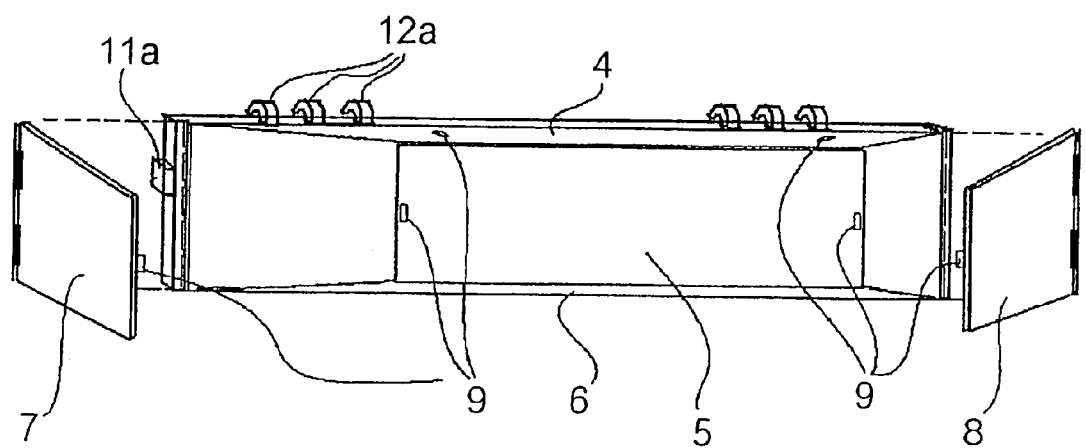
FIG. 2a is a perspective view of a structure of the AFIFD according to the present invention.
Figure 2B:
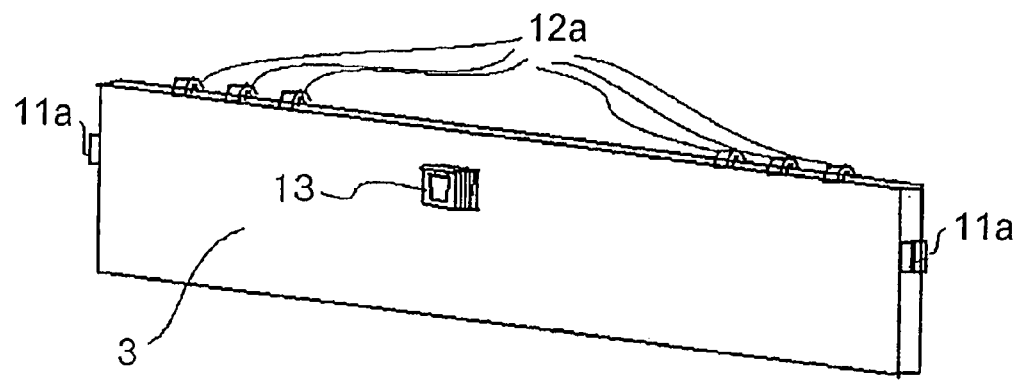
FIG. 2b is a rear perspective view of the AFIFD according to the present invention.

FIG. 2a is a perspective view showing an unfolded state of the AFIFD 1, and in FIG. 2a, front and rear plates 7 and 8 hinged to both ends of an inner plate 3 are separated from the AFIFD 1. FIG. 2b is a perspective view of the rear surface, and shows extensible connectors 13 protruding from the inner plate 3.

The AFIFDs 1 are mounted on the both sides of the amphibious vehicle 2 by hinges 12a and fixing member 11a respectively located on the upper portion and the side surface of the inner plate 3.

Figure 3A:
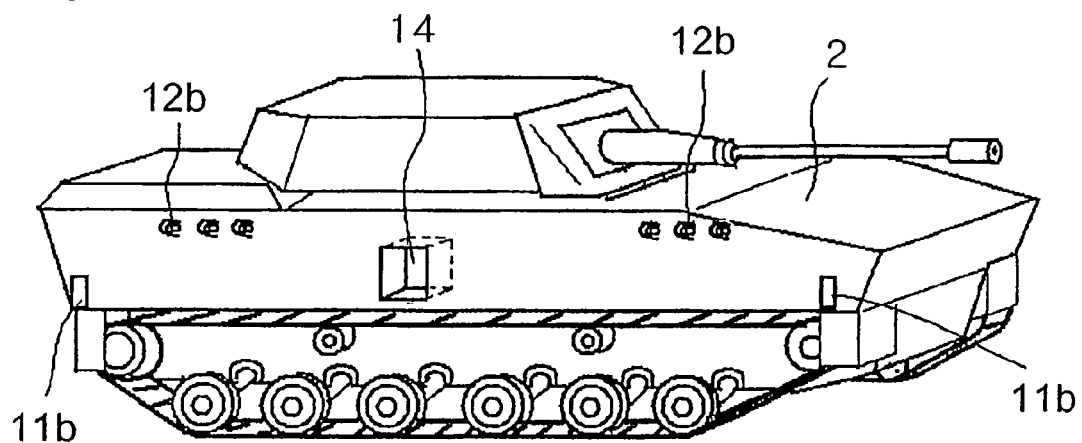
FIG. 3a is a side perspective view of the amphibious vehicle having a wall closet-type connecting room.

FIG. 3a is a side view of the amphibious vehicle 2, in which hinges 12b and fixing members 11b are mounted for assembling a wall-closet type connecting room 14 and the AFIFDs 1.

The end of the extensible connector 13 is attached and sealed to the middle of the wall closet-type connecting room 14.

Figure 3B:
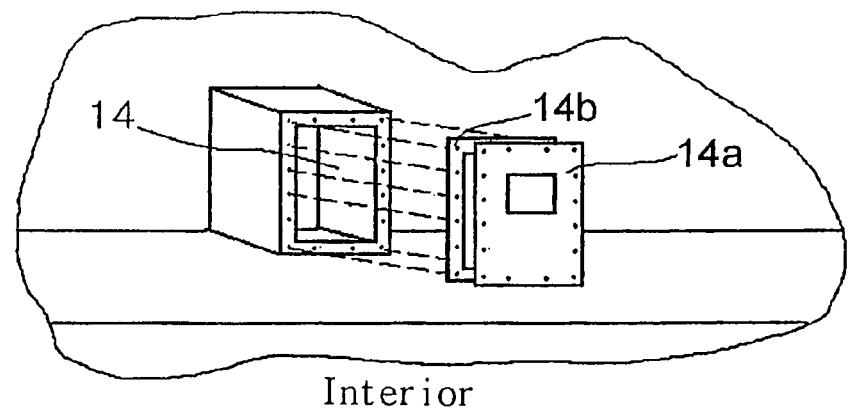
FIG. 3b is a perspective view showing the inside of the amphibious vehicle having the wall closet-type connecting room.

Basically, the wall closet-type connecting room 14 is constructed in such that only the outer portion is opened and the others are closed. However, as shown in FIG. 3b, if the wall closet-type connecting room 14 has a cover plate 14a and a seal plate 14b located on the inner surface for opening and closing the room 14, it is convenient in maintenance and repair. Therefore, it is preferable that the inner plate 3 is in assembled type having a sealing unit. Furthermore, if a transparent window or a periscope having an illuminating device are mounted on the cover plate 14a to visually observe the inside and operating status of the AFIFD, it is convenient in inspection and maintenance of the AFIFD and in check of submersion of the amphibious vehicle 2 during the swimming and of the swimming condition.

Figure 4:
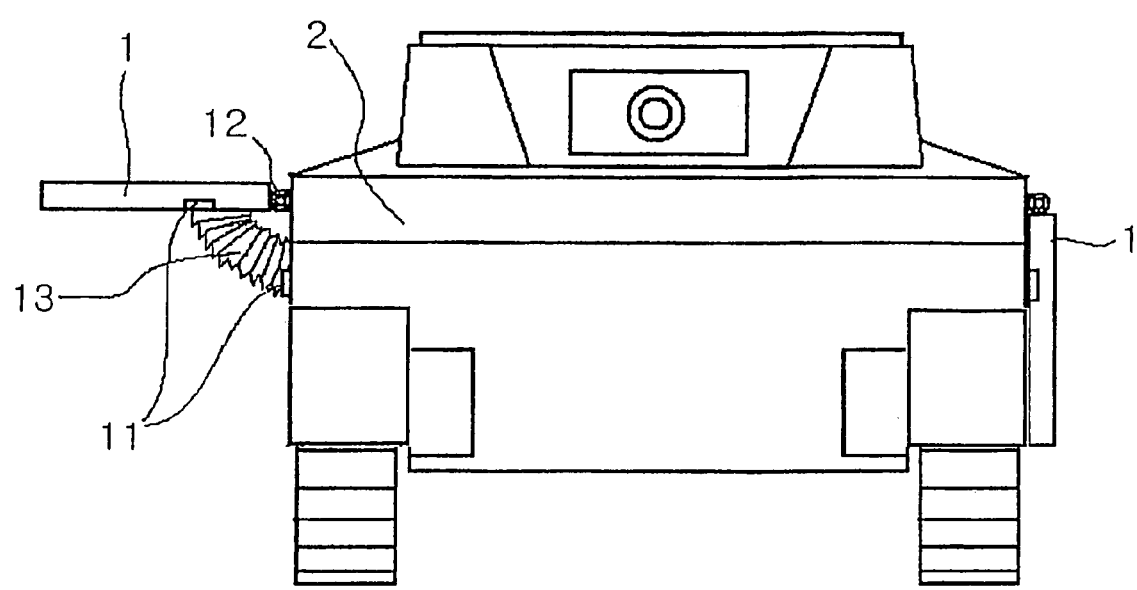
FIG. 4 is a front view of the amphibious vehicle of which the entire AFIFD is lifted up.

FIG. 4 is a front view of the amphibious vehicle 2 of which one AFIFD 1 is lifted up for allowing a vehicle mechanic to put the amphibious vehicle 2 in good order. To allow the vehicle mechanic to put the amphibious vehicle 2 in good order, the fixing members 11 for fixing the AFIFD and the vehicle body are unfastened and the actuators 18 are extended. The extended extensible connectors 13, which surround the actuators 18, are shown on the outside of the vehicle body.

Figure 5A:
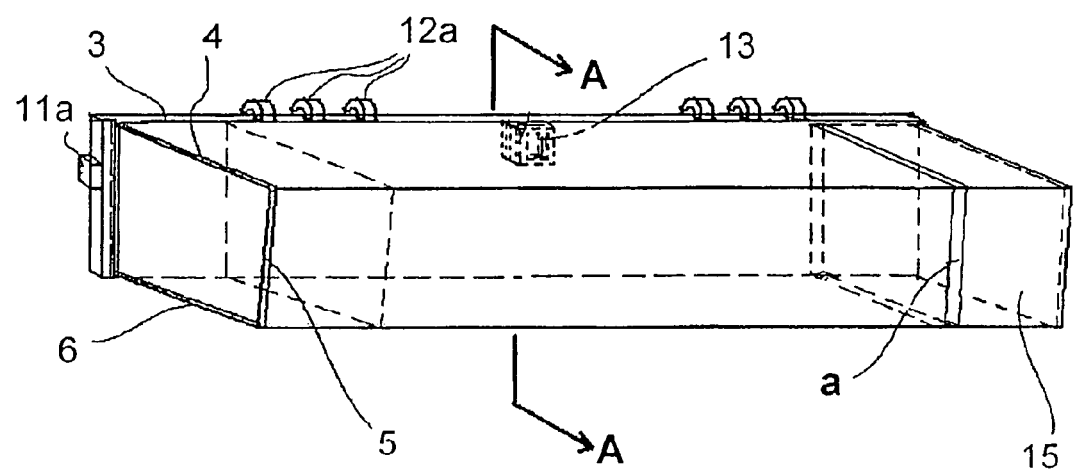
FIG. 5a is a perspective view showing a state that the AFIFD is unfolded.
Figure 5B:
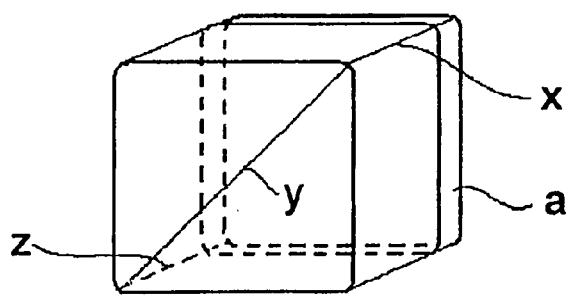

FIG. 5a is a perspective view showing an unfolded state of the AFIFD 1, excepting the front and rear plates 7 and 8, and FIG. 5b is a perspective view of thimble-type rubber membranes 15. As shown in FIGS. 5a and 5b, the AFIFD 1 with the exception of the front and rear plates 7 and 8 includes the inner plate 3, an upper armor plate 4, an outer armor plate 5, a lower armor plate 6, and the thimble type rubber membranes 15. The sealed floating space is formed inside the AFIFD 1 by organic coupling among the inner plate 3, the armor plates 4, 5 and 6, seal membranes 17 (see FIG. 6d) and the thimble-type rubber membranes 15 mounted on the front and rear of the AFIFD 1.

The seal membranes 17 for connecting two edges inside the floating space are respectively mounted on the hinged portions among the inner plate 3 and the armor plates 4, 5 and 6 to provide seal.

The thimble-type rubber membranes 15 are mounted on the front and rear surfaces of the AFIFD 1. It is preferable that the thimble-type rubber membranes 15 are made of rough and soft material, such as shields used in rubber boats, to be transformed when the upper armor plate 4, the lower armor plate 6 and the outer armor plate 5 are folded or unfolded.

Figure 6A:
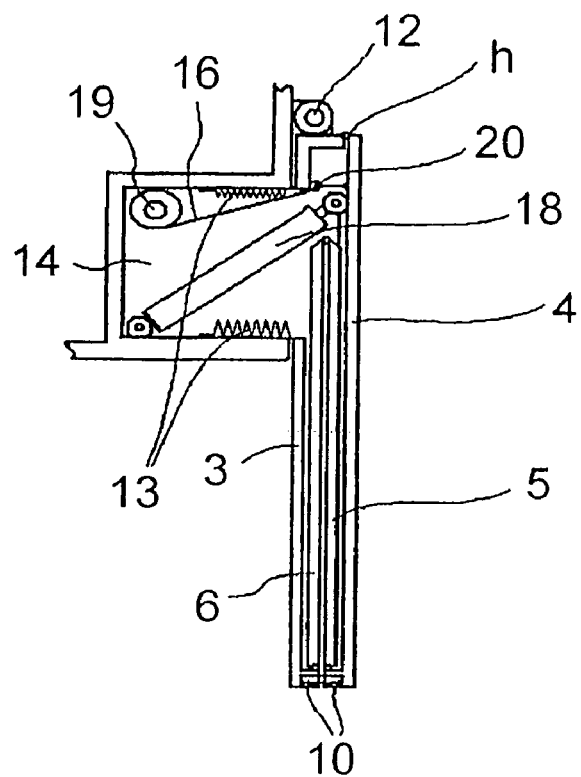
Figure 6B:
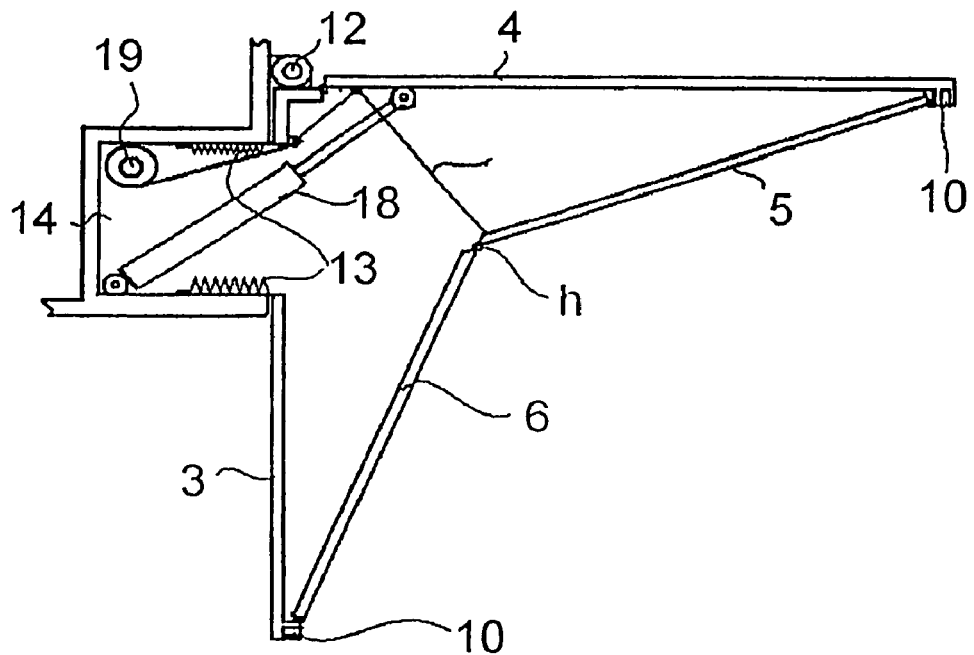
Figure 6C:
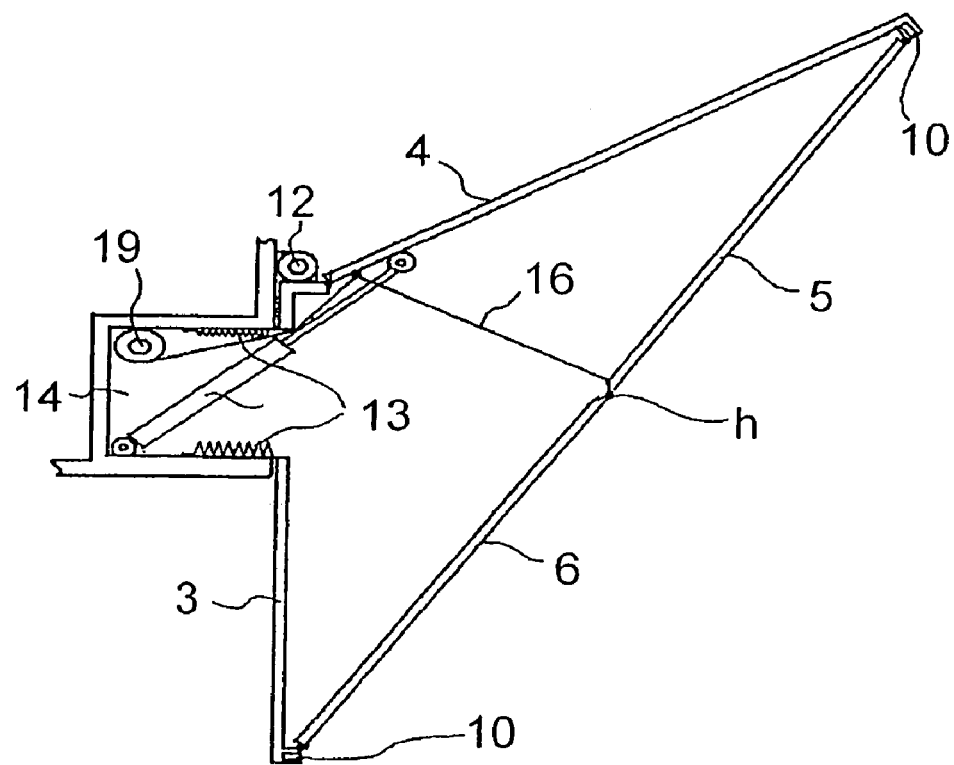
Figure 6D:
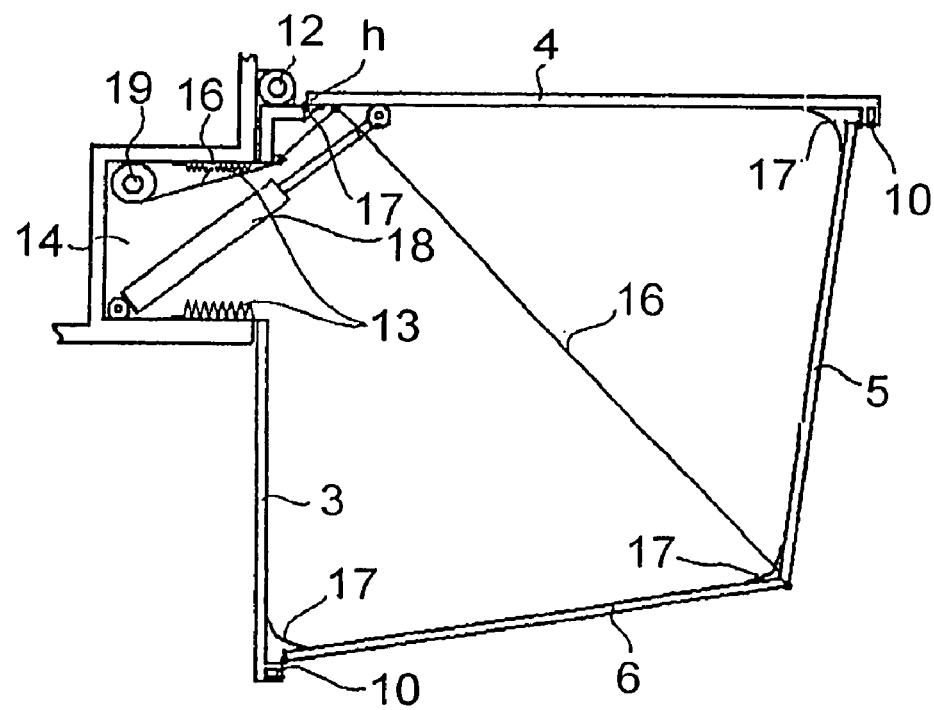

As shown in FIGS. 5a and 5b, because outer circumference sides(a) surrounding the ends of the thimble-type rubber membranes 15 are bonded with the corresponding portions of the plates 3, 4, 5 and 6, they are not separated from each other even though the armor plates 4, 5 and 6 are folded or unfolded, that is, the sectional form of the AFIFD 1 is changed as shown in FIGS. 6a to 6d. That is, even in state in which the sectional area of the AFIFD 1 is transformed the most severely as shown in FIG. 6c, the thimble-type rubber membranes 15 can maintain a seal function without separation or damage as the total sum of the protruding length of the thimble-type rubber membranes 15 and the diagonal length of a section of the rubber membranes 15 (namely, a length of x+y+z of FIG. 5b) is larger than the total sum of the width of the outer armor plate 5 and the width of the lower armor plate 6.

The thimble-type rubber membranes 15 can be applied to other embodiments of the present invention in the same way, and if necessary, the shape and protruding height (x and z of FIG. 5b) of the thimble-type rubber membranes 15 can be controlled.

To provide a seal function, in place of that the thimble-type rubber membranes 15, the seal membrane 17 and the extensible connector 13 are bonded to the armor plates 3, 4, 5 and 6 to form the sealed space, which has the shape and size suitable for the inner shape of the unfolded armor plates 3, 4, 5 and 6, and a rubber membrane bag having the extensible connectors 13 are prepared and partially attached to the main points of the armor plates 3, 4, 5 and 6. Therefore, the above double structure, together with the armor plates 3, 4, 5 and 6, can allow the above all folding and unfolding processes of the AFIFD. For driving means assembled to the armor plates 3, 4, 5 and 6 through the inside of the rubber membrane bag, the rubber membrane bag is cut to connect an assembled portion of the driving means, and the circumference of the cut portion is attached to the corresponding armor plates 3, 4, 5 and 6 to maintain a seal function.

The above method can be applied to all embodiments of the present invention as it provides good production efficiency and a reliable seal function.

As shown in FIGS. 6a and 6b, a winch 19 is mounted on the upper portion of the wall closet-type connecting room 14 to control the length of a rope 16 connected to the lower end of the outer armor plate 5 through a guide 20. The rope 16 is mounted to control the folding action of the outer armor plate 5 of the AFIFD 1 more smoothly than that only the actuator 18 and pneumatic pressure control the folding action.

FIG. 5a shows a state in which the front and rear surfaces of the AFIFD 1 is unfolded in the vertical direction to the side surface of the amphibious vehicle 2. However, if the front and rear surfaces are inclined toward the side surface of the amphibious vehicle 2, it can reduce water resistance. Of course, at this time, the upper armor plate 4 and the lower armor plate 6 are in the form of a trapezoid, the outer armor plate 5 is shortened, and the thimble-type rubber membranes 15 and armor plates 7 and 8 mounted on the front and rear surfaces are also transformed in correspondence with the armor plates 5 and 6. Such transformation can be applied to all embodiments of the present invention, which will be described later.

It is necessary to consider a space between the plates in folded state. As shown in FIG. 6a, a hinged portion(h) between the inner armor plate 3 and the upper armor plate 4 is formed at a place more protruding outwardly than at least the total sum of the width of the outer armor plate 5 and the width of the lower armor plate 6 so as to completely fold the outer armor plate 5 and the lower armor plate 6 and to fold and insert the thimble-type rubber membranes 11 into the space formed between the folded plates 5 and 6. Furthermore, the protruding height of a protruding portion, where the hinges are connected, and a structure such as a spacer must be considered in design to maintain an appropriate gap when the plates are folded.

It is preferable that the width of the upper armor plate 4, out of the armor plates 4, 5 and 6, is the longest, and the width of the outer armor plate 5 and the lower armor plate 6 is somewhat smaller than the width of the upper armor plate 4, so as to control a movement range up to the top dead center during the unfolding and inserting movement and to smoothly fold the outer and lower armor plates 5 and 6 to the inner plate 3.

Referring to FIGS. 6a to 6d, a process for unfolding the AFIFD 1 will be described. The remaining processes performed after front and rear plate locking members 9 are unfastened and the front and rear plates 7 and 8 are rotated and unfold will be described.

In the drawings, the thimble-type rubber membranes 15 are mounted on the front and rear surfaces of the AFIFD 1, but its description will be omitted. In the drawings, spots indicated on each edge designate rotation points(hinge points).

As shown in FIG. 6a, an upper plate locking member 10 is unfastened in state in which the AFIFD 1 is folded and the actuator 18 is extended. The upper armor plate 4 connected with a rod of the actuator 18 is lifted up, and thereby, air is gradually supplied through an air supply line(not shown) connected with the wall closet-type connecting room 14. Then, the winch 19 is operated to gradually loose the rope 16 through the guide 20. Here, the guide 20 serves to prevent damage of the rope by contacting the extensible connector 13 or other rubber membrane when the rope is moved. Not shown in the drawings, but a separate tube(not shown) can be mounted at the place where there is possibility of contact, so that the rope is moved inside the tube.

The upper armor plate 4 is rotated upwardly on the hinge point in contact with the inner plate 3 after passing the process of FIG. 6. If the actuator 18 is extended continuously, as shown in FIG. 6c, the outer armor plate 5 and the lower armor plate 6 are in a straight line. In this condition, the upper armor plate 4 is lifted up the most. After that, the actuator 18 is contracted until the upper armor plate 4 is at a horizontal level, and then, the outer armor plate 5 is unfolded by pneumatic pressure as shown in FIG. 6d, so that the AFIFD 1 is completely unfolded.

The above process is carried out by an inner control device(not shown) of the vehicle body controlling the actuator, the winch and the pneumatic pressure.

The unfold process is finished when the front and rear plate locking members 9 are fastened to the outer armor plate 5.

When the swimming is finished, the AFIFDs 1 are folded and converted into a ground-running mode. The converting process for the ground-running is carried out in contrariwise to the unfold process.

Because it is profitable to install two or more of actuators 18 or winches 19, rather than to install only one actuator 18 or winch 19, the wall closet-type connecting room 14 and the extensible connector 13 are made larger or two or more of wall closet-type connecting rooms 14 and extensible connectors 13 are installed.

The AFIFD 1, which is easily unfolded using pneumatic pressure by an air pump and the driving means, such as the actuators and the winches, provides additional buoyancy, which corresponds to the volume of the inner floating space, to the amphibious vehicle 2, thereby increasing stability in the swimming of the amphibious vehicle. Additionally, because the inflatable AFIFD 1 according to the present invention can be easily folded by discharging the air and using the driving means, the state of the AFIFD can be easily and rapidly converted for the swimming and the ground-running during a combat, so that fighting power of the amphibious vehicle 2 can be increased.

For allow the vehicle mechanic to put the lower part of the vehicle body in good order, it is necessary to lift up the entire AFIFD 1. At this time, the fixing members 11 for fixing the amphibious vehicle 2 and the AFIFD 1 are all unfastened and the actuators 18 are extended, as shown in FIG. 4. At this time, the extensible connectors 13 are extended (it is preferable to open an air valve). After the maintenance, the actuators 18 are contracted and the fixing members 11 are fastened again to return to the original condition.

EMBODIMENT 2

Figure 7:
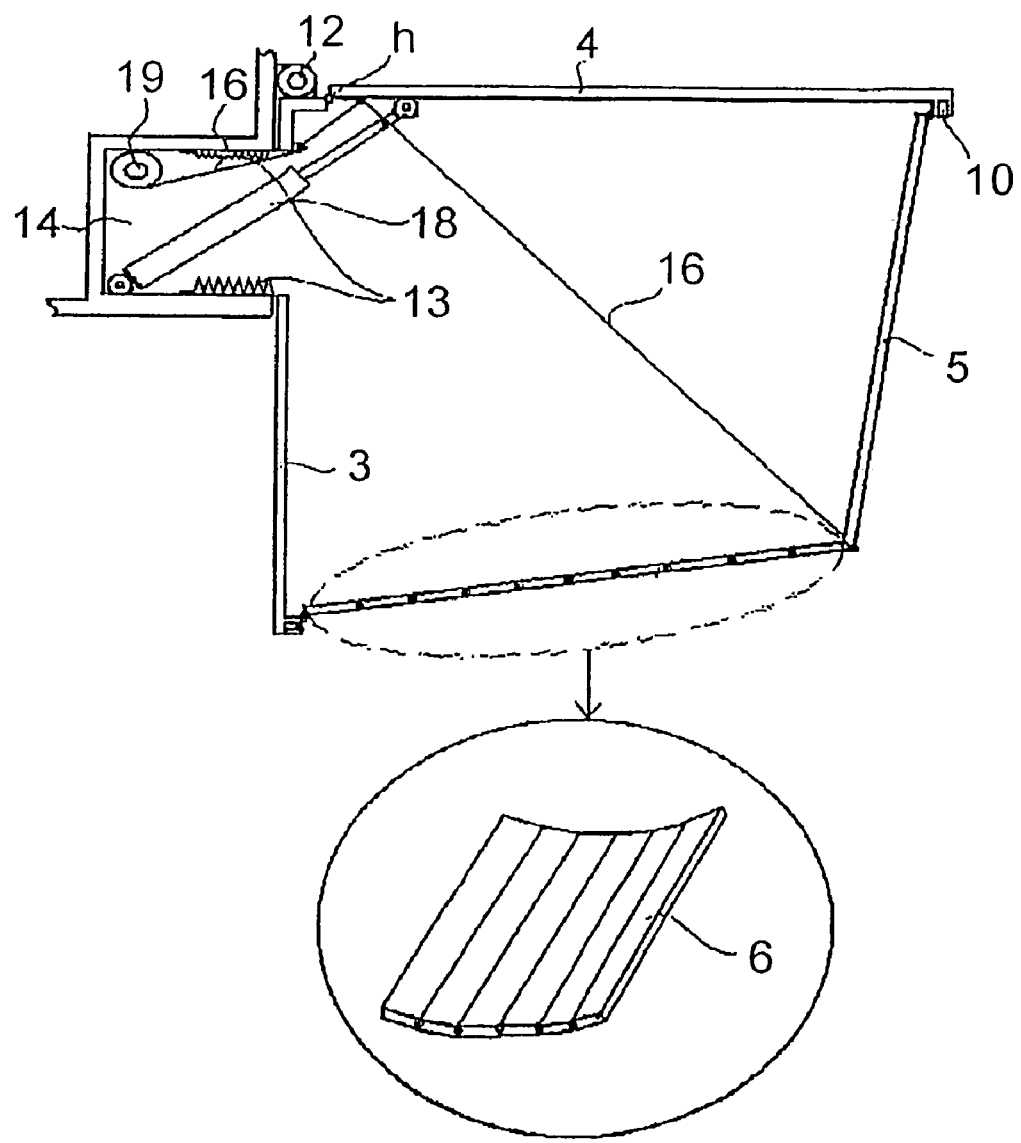
FIG. 7 is a sectional view of the AFIFD according to a second embodiment of the present invention.

FIG. 7 shows a second embodiment of the AFIFD 1 according to the present invention. The second embodiment has the same structure as the first embodiment, excepting that the bottom surface of the AFIFD 1 has a multi-strip armor plate 6, in which strips are hinged with each other. The strips of the strip armor plate 6 are hinged with each other, and the strip armor plate 6 has a seal membrane(not shown) to form a sealed space.

Because the strip armor plate 6 can be bended, the condition of the AFIFD 1 can be more rapidly converted without unfolding the upper armor plate 4 more than an angle of 90 degrees to the side surface of the amphibious vehicle when the AFIFD 1 is folded and unfolded, and the strokes of the actuators 18 or the space of the wall closet-type connecting room 14 can be designed smaller. Moreover, because also the thimble-type rubber membranes 15 are relatively converted somewhat, it is possible to reduce the protruding height of the thimble-type rubber membranes 15.

EMBODIMENT 3

In this third embodiment of the AFIFD 1 according to the present invention, a rubber membrane is used in place of the lower armor plate 6 of the first embodiment.

In general, there is little possibility that the bottom surface of the AFIFD 1 is attacked when the amphibious vehicle swims in water while unfolding the AFIFD 1. Therefore, to reduce the weight of the AFIFD 1, the armor plate is not mounted on the bottom surface of the AFIFD 1, and rubber membranes are mounted on the bottom surface as well as the front and rear surfaces of the AFIFD 1.

EMBODIMENT 4

The fourth embodiment has the same structure as the second embodiment, excepting that both the lower armor plate and the outer armor plate are in multiple strip type. According to the above structure, when the AFIFD 1 is unfolded, the outer contour formed by the outer protective strip and the lower protective strip is unfolded in somewhat curved form. The fourth embodiment provides smoother folding and unfolding actions of the AFIFD 1 than the second embodiment. The front and rear plates 7 and 8 has the shape corresponding to the sectional form of the AFIFD 1. The AFIFD 1 has a number of locking members, so that the front and rear plates 7 and 8 are coupled and fastened to the upper armor plate 4 and the protective strips of the outer and bottom surfaces.

EMBODIMENT 5

The fifth embodiment has the same structure as the third embodiment, excepting that the outer armor plate 5 has multiple strips. Mechanically, the fifth embodiment of the present invention has the section similar to that of the third embodiment, and so, an edge portion, where the outer protective strip and the rubber membrane (or multi-joint bar) of the bottom surface are meet with each other, is unfolded in the form of an arc when the AFIFD 1 is unfolded, and also, the AFIFD 1 is folded in similar way so as to provide smooth folding action. Furthermore, the front and rear plates can be mounted suitable for the section of the AFIFD 1. The AFIFD 1 has a number of locking members, so that the front and rear plates 7 and 8 are coupled and fastened to the outer protective strip.

EMBODIMENT 6

FIG. 8 is a sectional view of another modified embodiment of the AFIFD according to the present invention.

Figure 8A:
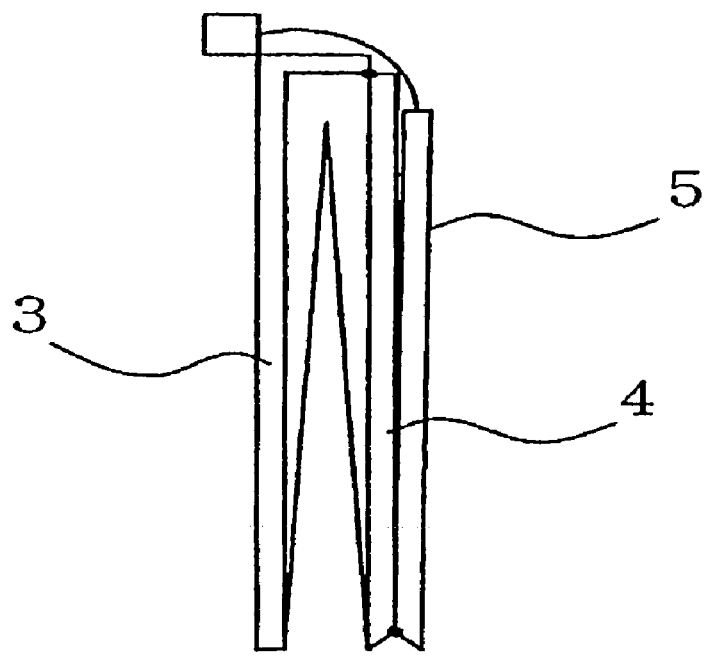
FIGS. 8a to 8c are sectional views showing an unfolding process of the AFIFD according to the second embodiment of the present invention.
Figure 8B:
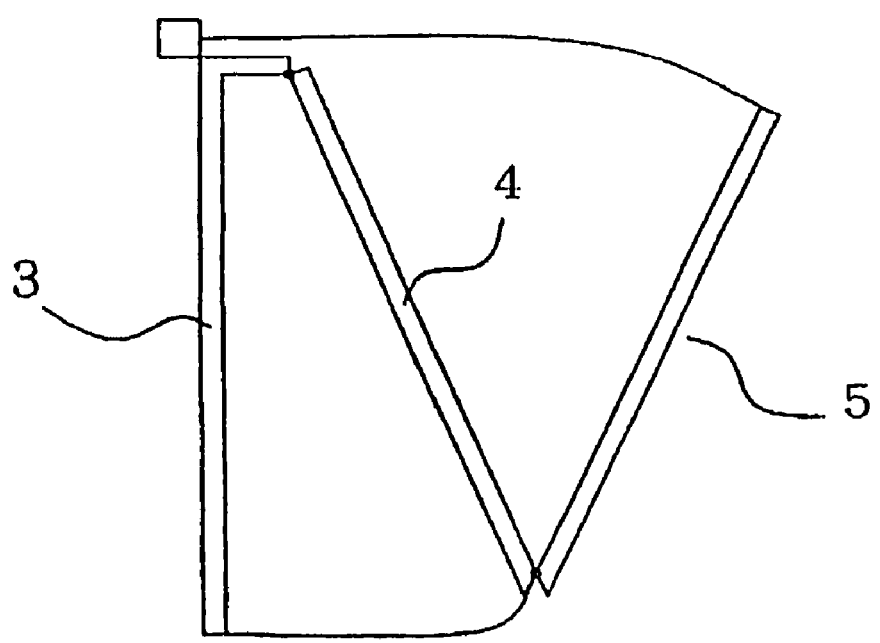
Figure 8C:
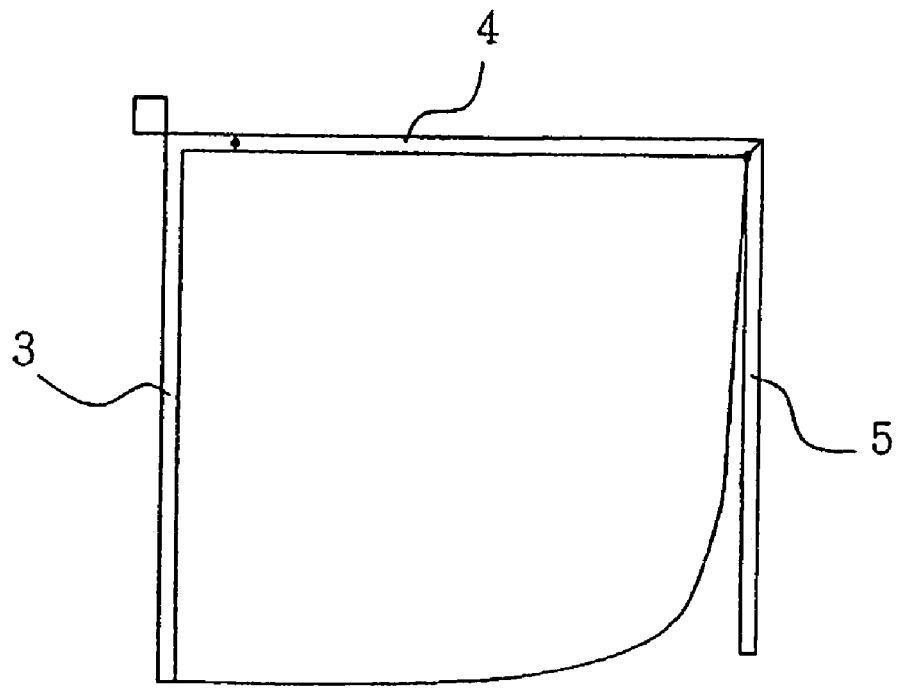

FIG. 8 shows the AFIFD in which the rope 16 for connecting the upper edge portion of the outside of the inner plate 3 and the lower end of the outside of the outer armor plate 5 is connected not to the inside but to the outside of the floating space (as shown in FIG. 8*a*, also the winch is mounted on the outside of the sealed space). As shown in FIG. 8*b*, the upper armor plate 4 is folded deeper than the outer armor plate 5, and the outer, lower, front and rear surfaces have rubber membranes respectively. As shown in FIG. 8*c*, in the unfold condition, the outer armor plate 5 is coupled with the front and rear plates 7 and 8 to protect the rubber membranes without regard to formation of the sealed space.

EMBODIMENT 7

Figure 9:
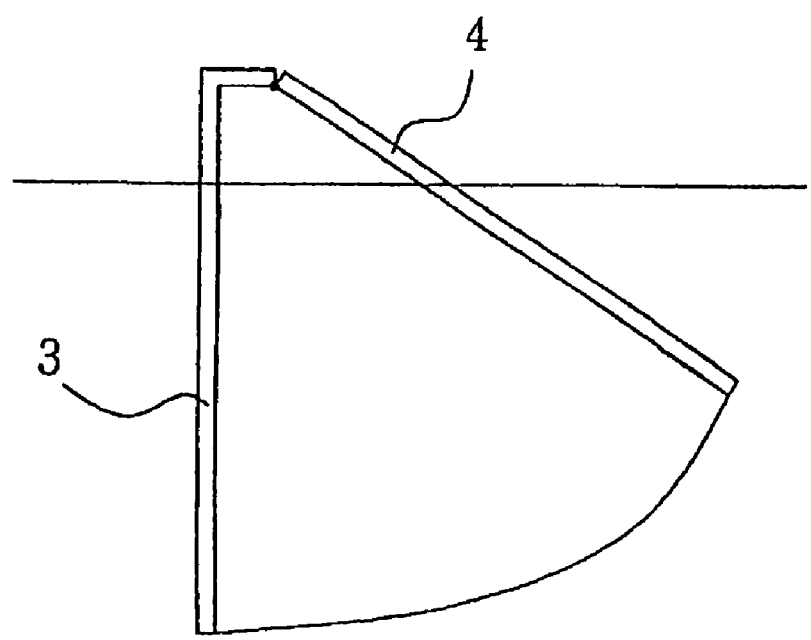
FIG. 9 is a sectional view of the AFIFD according to a third embodiment of the present invention.

In FIG. 9, the upper armor plate 4 is inclined downwardly to serve as both the top surface and the outer surface, and so, it can protect the upper and side surfaces without the outer armor plate. Therefore, also the winch, the guide or the rope is not needed.

The front and rear plates 7 and 8 being in the form of a trapezoid are mounted to provide protection power to all surfaces excepting the bottom surface.

EMBODIMENT 8

Figure 10:
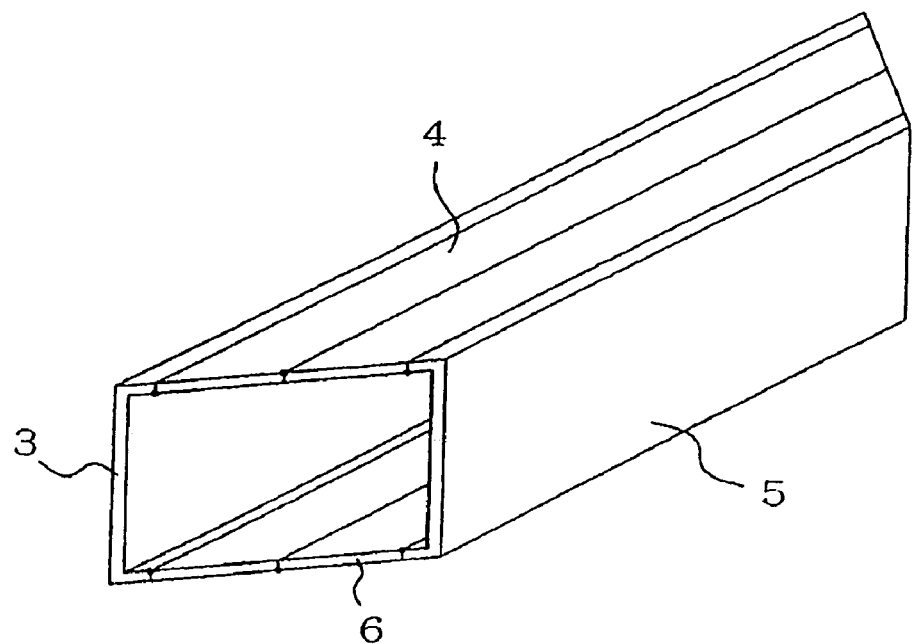
FIG. 10 is a perspective view of the AFIFD according to the third embodiment of the present invention.

FIGS. 10 and 11 show a further modified embodiment of the armored inflatable floating plate according to the present invention.

FIG. 10 is a perspective view showing a state in which the AFIFD of the eighth embodiment is unfolded. The thimble-type rubber membranes 15 and the front and rear plates 7 and 8 are omitted from FIG. 10. As shown in FIG. 11, in the eighth embodiment, the upper armor plate 4 and the lower armor plate 6 are paired armor plates, which are foldable in the inward direction, that is, in the inward direction of the floating space.

Figure 11A:
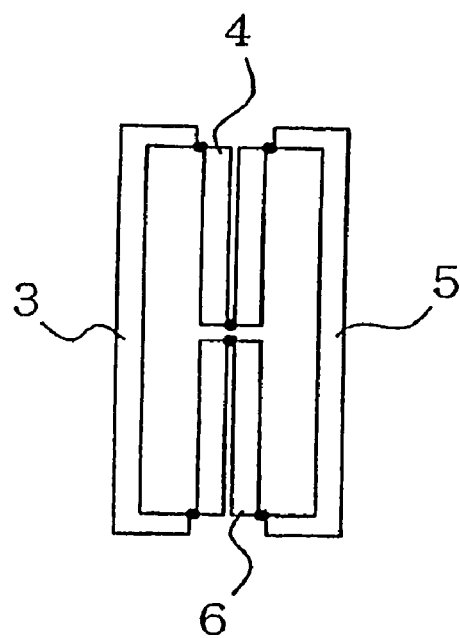
FIGS. 11a to 11c are sectional views showing an unfolding process of the AFIFD according to the third embodiment of the present invention.
Figure 11B:
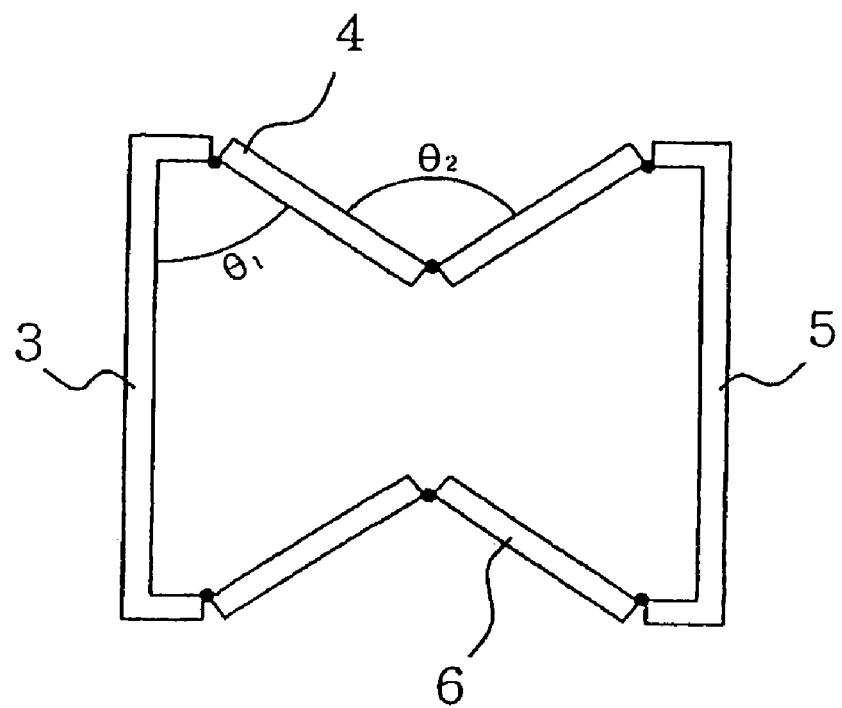

The hinges for connecting the armor plates are restricted in movement range, for example, in FIG. 11*b*, θ1 is 0˜90 degrees and θ2 is 0˜180 degrees. When the AFIFD is completely folded or unfolded, the weight of the AFIFD can be maintained by the hinged structure.

Not shown in the drawings, but it is preferable that the upper edge of the inner plate 3 and the lower edge of the outer plate 5 are connected through the rope, and the rope is tightly pulled in completely unfold condition, so that the rope shares self-weight on ground. Alternatively, the lower edge of the inner plate 3 and the upper edge of the outer plate 5 are connected through the rope, so that the rope shares buoyancy in water.

Figure 11C:
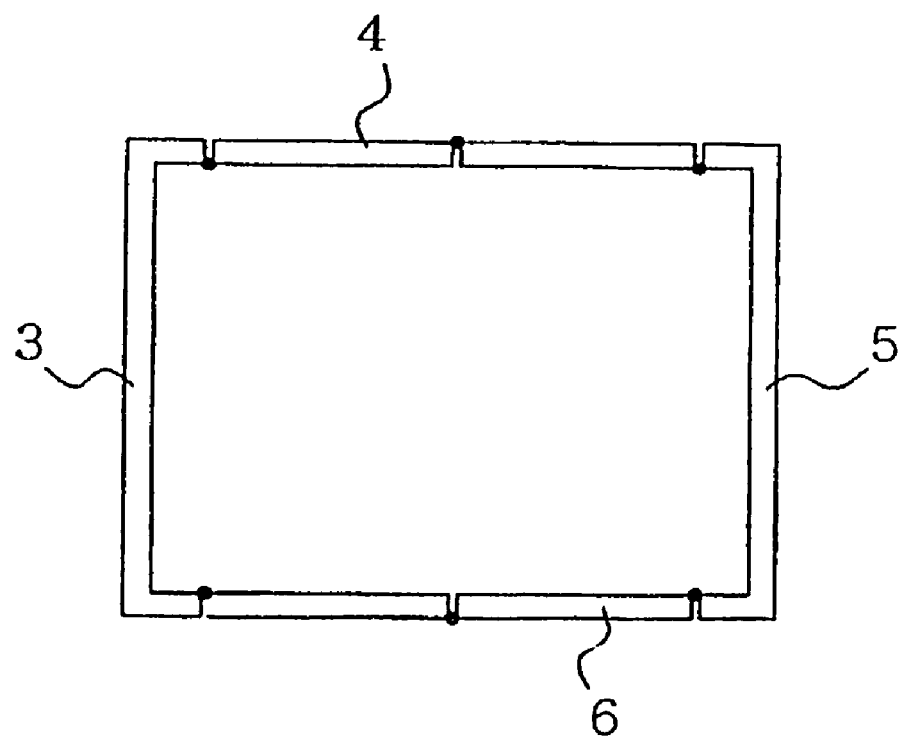

FIGS. 11*a* to 11*c* show the unfolding process of the AFIFD according to the eighth embodiment. When the air is supplied into the floating space by the air pump(not shown) in state in which the AFIFD is completely folded(see FIG. 11*a*). At this time, the upper and lower armor plates 4 and 6 can be unfolded by increasing pneumatic pressure by the air pump even though the AFIFD does not have additional driving means, such as the ropes or the actuators. As shown in FIG. 11*b*, the upper armor plate 4 is unfolded through a "V" shape from an "11" shape, and the lower armor plate 6 is unfolded through a "Λ" shape from the "11" shape.

After the AFIFD is completely folded, the locking members(not shown) located on the upper and lower ends of the AFIFD fasten the outer armor plate 5 and the upper and lower armor plates 4 and 6.

The actuator 18 is attached to a proper location of the outside of the inner plate 3 for preparing the time that the entire AFIFD 1 is lifted up.

Furthermore, as the sealed space is restricted only by the AFIFD, it would be appreciated that any other unit for providing air can be used in place of the extensible connector 13.

If the upper and lower armor plates 4 and 6 have a number of folds like an accordion, it can be very effective when great buoyancy is needed. In this case, it is preferable that the hinged location and structure is designed in such that sufficient gaps are formed between the folded portions, so that the thimble-type rubber membranes 15 are folded and inserted between the folded plates, namely, gaps of the "Λ" shape of the upper plate and the "V" shape of the lower plate.

Also, in this embodiment, the front and rear plates 7 and 8 may be collapsible. If pins are mounted at upper and lower portions of the end of the outer armor plate 5, and flanges having elongated holes for inserting the pins are mounted on the whole vertical length of the front and rear plates 7 and 8 at a right angle to the front and rear plates 7 and 8. Then, the front and rear plates are automatically moved to the folded or unfolded position when the AFIFD is folded or unfolded.

EMBODIMENT 9

As described in the fourth embodiment, there is little possibility that the bottom surface of the AFIFD is attacked. So, to reduce the weight of the AFIFD 1, the armor plate is not mounted on the bottom surface of the AFIFD 1, and rubber membranes are mounted on the bottom surface as well as the front and rear surfaces of the AFIFD 1. At this time, to allow the AFIFD to be folded and unfolded in the same way as the above, by having the same mechanical effect as the bottom surface made of plate material, a frame set(not shown) is mounted inside the rubber membranes in place of the two plates located on the bottom surface. As the frame are bended only in one direction(in the inward direction of the floating space), the AFIFD can maintain the sectional shape shown in FIGS. 11*b* and 11*c* when the AFIFD is folded.

Like the eighth embodiment, also the ninth embodiment can have the upper plate and the frame set having a number of folds. At this time, it is preferable that the AFIFD has gaps formed in the outside where the lower frame set is bended so as to allow the shields to be folded and inserted between the gaps.

According to the embodiment shown in FIGS. 10 and 11, the AFIFD can be folded and unfolded only by controlling pneumatic pressure inside the floating space.

Outer Armor Plate Having Cut Portion

As described above, the AFIFD according to the first to fifth embodiments of the present invention is folded and unfolded by using the driving means, such as the actuators 18, for connecting the wall closet-type connecting room 14 and the inside of the upper armor plate 4 and by using the ropes for connecting the winches 19 and the lower end of the outer armor plate 5. However, a space for the actuator 18 must be secured to locate the actuator 18, which is connected to the wall closet-type connecting room 14 and the upper protective 4, inside the AFIFD 1. Therefore, the width of the outer armor plate 5 is considerably shortened, the section of the outer plate 5 is changed into the form of a trapezoid or a lozenge, and the volume of the outer plate 5 is somewhat reduced, so that the floating power of the AFIFD is reduced. So, there is room for improvement in consideration of that it is necessary to increase buoyancy, which can be obtained by the AFIFD of the same weight.

Figure 12A:
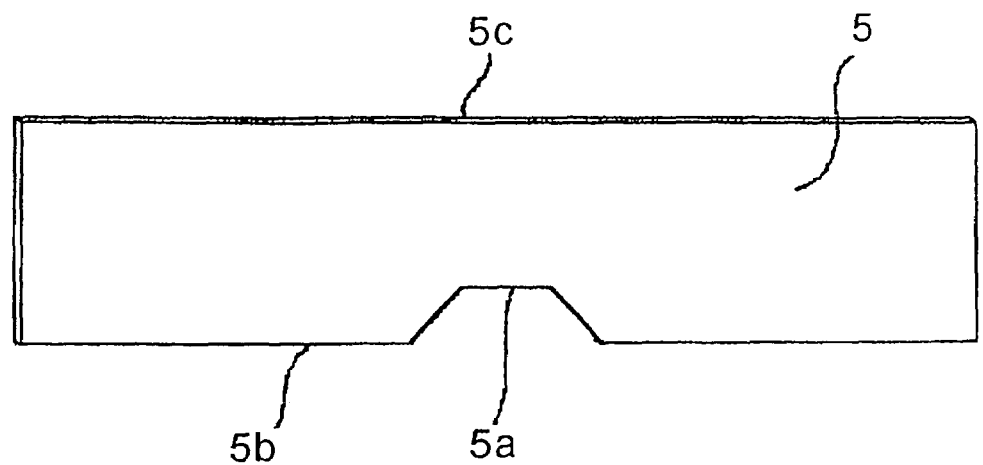
FIG. 12a is a view, seen from the outside, of an outer armor plate of the AFIFD according to the third embodiment of the present invention.
Figure 12B:
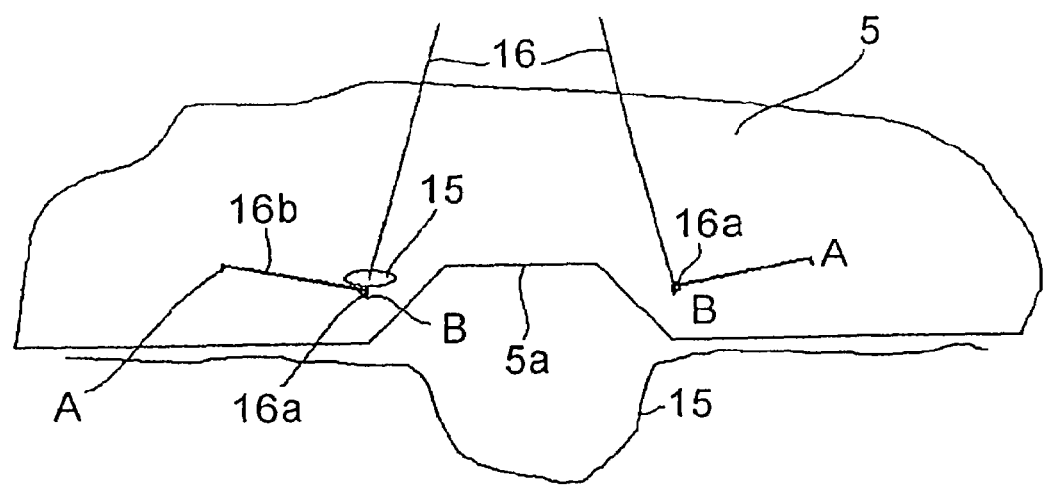
FIG. 12b is a view, seen from a floating space side, of the outer armor plate of the AFIFD according to the third embodiment of the present invention.

FIGS. 12a and 12b show another embodiment of the present invention considering the above improvement. FIG. 12a shows the outer armor plate, seen from the outside, and FIG. 12b shows the outer armor plate, seen from the inside(the floating space side), used in the AFIFD. Because there is little possibility that the bottom surface of the AFIFD is attacked during the swimming of the amphibious vehicle, this embodiment will be described about a structure in which the lower armor plate 6 is not used.

Referring to FIG. 12a, an upper end 5c of the outer armor plate 5 is a portion being in contact with the upper armor plate 4, and the center of a lower end 5b of the outer armor plate 5 is cut in the form of a trapezoid. The cut portion 5a is to prevent interference between the outer armor plate 5 and the actuator 18 when the outer armor plate 5 is folded to the inner plate 3. That is, the cut portion 5a is a portion corresponding to the attached portion of the actuator 18, which is the driving means of the upper armor plate, when the outer armor plate 5 is folded to the upper armor plate 4. So, the cut portion 5a of the outer armor plate 5 facilitates free movement of the actuator 18 without interference of the outer armor plate 5. There is no necessity to make the cut portion in the form of the trapezoid, and it would be appreciated that any forms, for example, a semicircle, a semi-oval or others, can be applied if the actuator 18 can be moved without interference of the outer armor plate 5.

The above is a description about the case that the AFIFD does not have the lower armor plate 6, but the same principle can be applied even though the AFIFD has the lower armor plate 6. In this case, the edge of the lower armor plate 6, which is connected with the lower end 5b of the outer armor plate 5, contacting the cut portion 5a of the outer armor plate is cut in the same way as the cut portion 5a so as to secure a space for the driving means.

Space Securing Device

As an air bag 15 is located inside the AFIFD 1, it is necessary to consider interference between the air bag 15 and the actuator 18 in movement of the actuator 18. That is, to prevent interference from the air bag 15 by securing the space for the actuator 18 when the outer armor plate 5 is folded to the inner plate 3, a part of the air bag 15 is moved when the outer armor plate 5 is folded, so that the space for actuator 18 can be secured. FIG. 12b shows an embodiment of the space securing device.

FIG. 12b shows the outer armor plate 5, seen from the inside(floating space side). The winch 19(not shown) and the rope 16 for connecting a predetermined location of the outer armor plate 5 are used to fold and unfold the AFIFD 1. In the present invention, two ropes are used, and ends of the rope 16 connected with the outer armor plate 5 are respectively connected to the left and right of the cut portion 5a of the outer armor plate 5. As shown in FIG. 12b, the rope 16 passes the air bag in sealed condition and is connected with the outer armor plate 5, ends of the rope 16 connected with the outer armor plate 5 respectively have rings 16a. The rope rings 16a are slidably connected to a rope connecting body 16b.

When the unfolded AFIFD 1 starts to perform the folding action, the winch 19 is operated and the rope 16 is pulled little by little. At this time, as the outer armor plate 5 is folded by the rope 16, the rope rings 16a slide toward the cut portion 5a of the outer armor plate. That is, the rope ring 16a is located at an A position of the rope connecting body 16b when the AFIFD 1 is unfolded, but the rope ring 16a slides gradually and is located at a B position of the rope connecting body 16b when the AFIFD 1 is folded by the rope 16. Therefore, the air bag 15 part around the cut portion 5a of the outer armor plate 5 is pulled toward the cut portion 5a, and thereby, the space for the driving means 18 can be secured.

Fabric Membrane or Rope Connecting Inner Plate and Outer Armor Plate

Because there is little possibility that the bottom surface of the AFIFD is attacked when the amphibious vehicle swims in water in a state in which the AFIFD is unfolded, it is preferable that the armor plate is not used to the bottom surface of the AFIFD to reduce the weight thereof. However, in the above AFIFD, as the air bag 15 is partially attached to the inner plate 3, the upper armor plate 4 and the outer armor plate 5 as much as it is needed, if internal pressure is formed during the unfolding, a non-restricted portion of the air bag attached to the armor plates is not in the form of an angled shape but in the form of a round. Therefore, there is a need to solve problems occurring by the above, and FIG. 13 shows an embodiment to solve the above problem.

Figure 13:
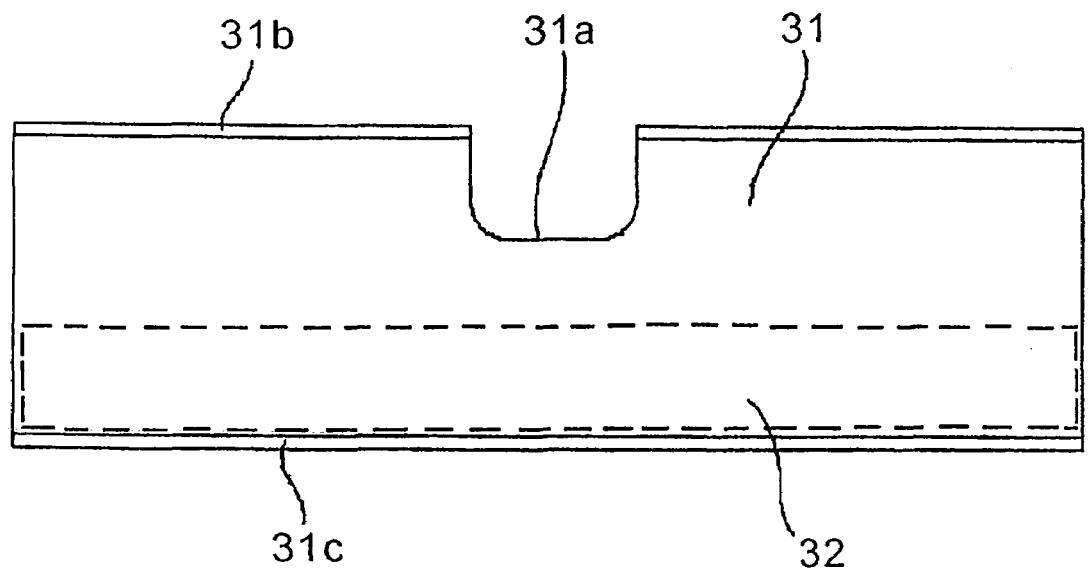
FIG. 13 is a view of a fabric membrane according to the present invention.

FIG. 13 is a view of the fabric membrane used to the AFIFD according to the present invention. Though the fabric membrane 31 is in the form of a rectangle, it can also be a trapezoidal form and so on, and the shape of the fabric membrane 31 is not restricted to a certain shape. One 31b of two long sides is connected with the lower end 5b of the outer armor plate 5, and the other 31c is connected to the lower end of the inner plate 3. However, a portion 31a being in contact with the cut portion 5a of the outer armor plate, out of the portion 31b connected with the lower end 5b of the outer armor plate 5, is cut in the same way as the cut portion 5a to secure the space for the actuator 18.

As described above, if the fabric membrane 31 is connected to the lower end of the inner plate 3 and the lower end of the outer armor plate 5, it can restrict the unfolded width of the outer armor plate 5 to locate the outer armor plate 4 at about a right angle to the upper armor plate 4 regardless of pressure pushing out the outer armor plate 5 during the unfolding of the AFIFD, and prevent an excessive widening of the hinges(not shown) of the upper end of the outer armor plate 5. However, even though the fabric membrane 31 is mounted, it is unavoidable that the lower portion of the AFIFD 1 is curved somewhat downwardly due to pressure of the air bag 15. To maintain the perpendicular condition between the outer armor plate 5 and the upper armor plate 4, the fabric membrane 31 requires the width corresponding to a curved distance greater than a straight distance connecting the lower end of the inner plate 3 and the lower end of the outer armor plate 5. The value can be changed according to air bag filling pressure and an attachment design result of the air bag.

As shown in the drawings, the fabric membrane 31 includes a fabric hardening portion 32, which is not bended or broken off in free condition. The fabric hardening portion 32 is located closely to the inner plate 3 of the fabric membrane. If the fabric hardening portion 32 is not bended in free condition and has a sliding property, such as Teflon coating, it serves as a guide to prevent the fabric membrane 31 and the air bag 15 from being inserted into the gaps of the bottom surfaces of the armor plates during the folding process of the AFIFD.

Figure 14:
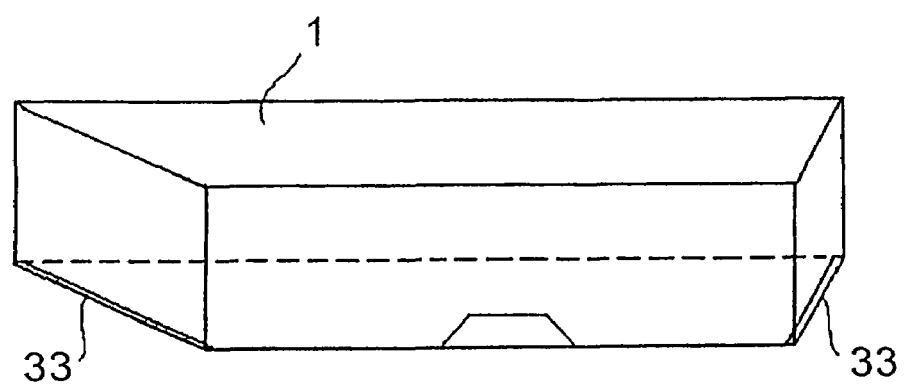
FIG. 14 is a perspective view of the AFIFD having a rope.

Furthermore, as shown in FIG. 14, ropes 33 can be mounted in place of the fabric membrane. When two ropes 33 are respectively connected to right and left edge portions of the lower end of the outer armor plate 5 and right and left edge portions of the lower end of the inner plate 3, it can avoid interference of the air bag 15 inside the AFIFD and control the unfolded width of the outer armor plate 5 to locate the outer armor plate 5 at a right angle to the upper armor plate 4 when the AFIFD 1 is unfolded.

Fabric Bands of Front and Rear Surfaces of AFIFD

Figure 15:
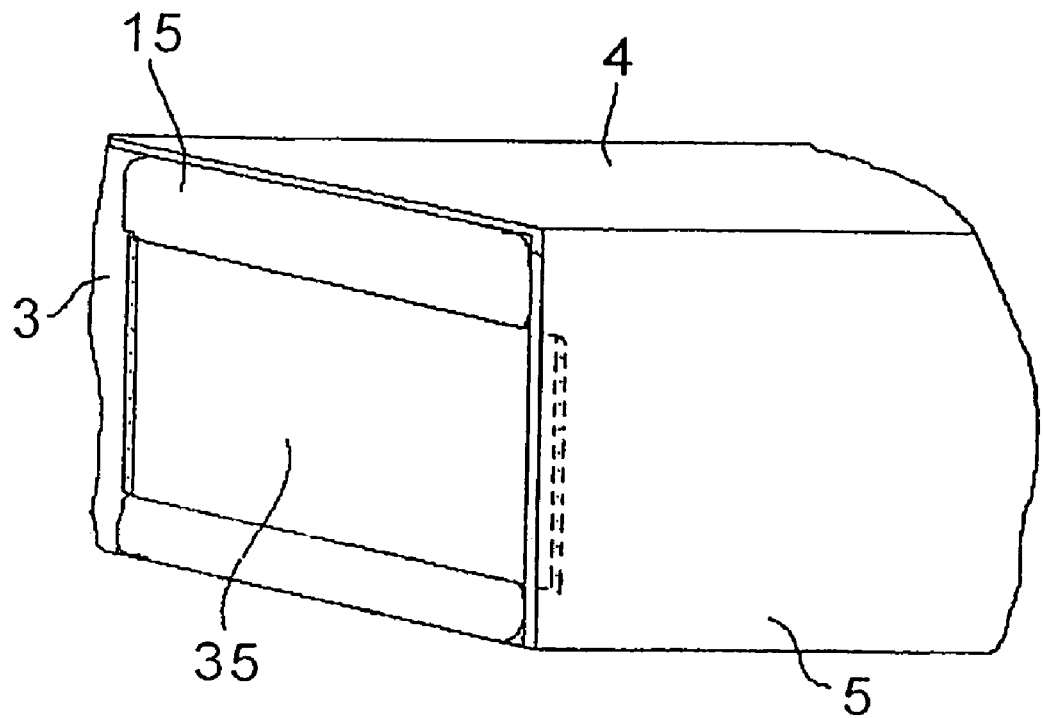
FIG. 15 is a view of a fabric band according to the present invention.

When the AFIFD 1 is unfolded and the air bag 15 is filled with air, there is possibility that the front and rear surfaces of the air bag, which is partially in free condition, protrude more than the inner surface of the front and rear plates 7 and 8. As shown in FIG. 15, fabric bands 35 are mounted on the front and rear surfaces of the AFIFD 1 to solve the problem. The fabric bands 35 prevent the direct contact of the air bag 15 with the front and rear plates 7 and 8, thereby preventing interference of the air bag 15 when the front and rear plates 7 and 8 are closed to the AFIFD 1.

AFIFD for Front Surface of Amphibious Vehicle

If the AFIFDs are mounted on the front surface of the amphibious vehicle as well as the side surfaces, the amphibious vehicle can obtain more buoyancy than the amphibious vehicle having the AFIFDs mounted only on the side surfaces and balance buoyancy.

Figure 16A:
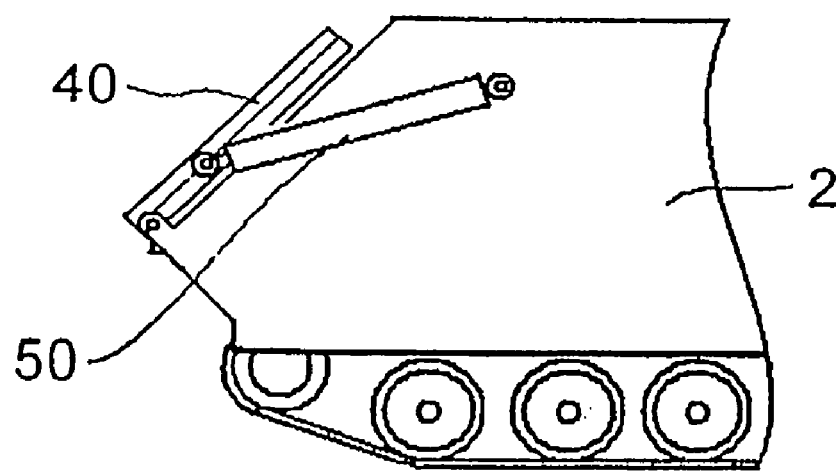
FIG. 16a is a view showing a ground-running state of the AFIFD for the front surface.
Figure 16B:
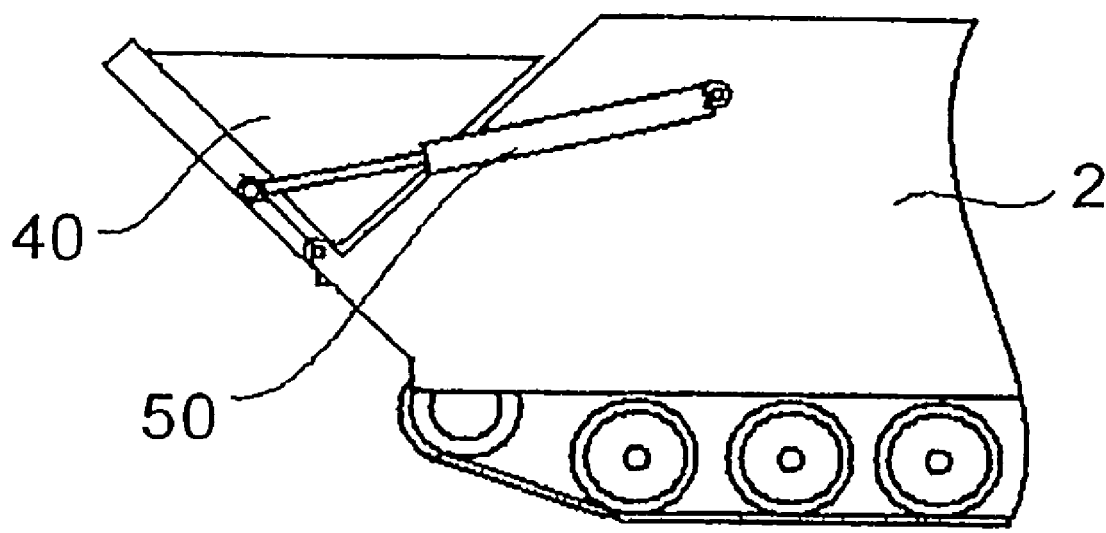
FIG. 16b is a view showing a swimming state of the AFIFD for the front surface.
Figure 16C:
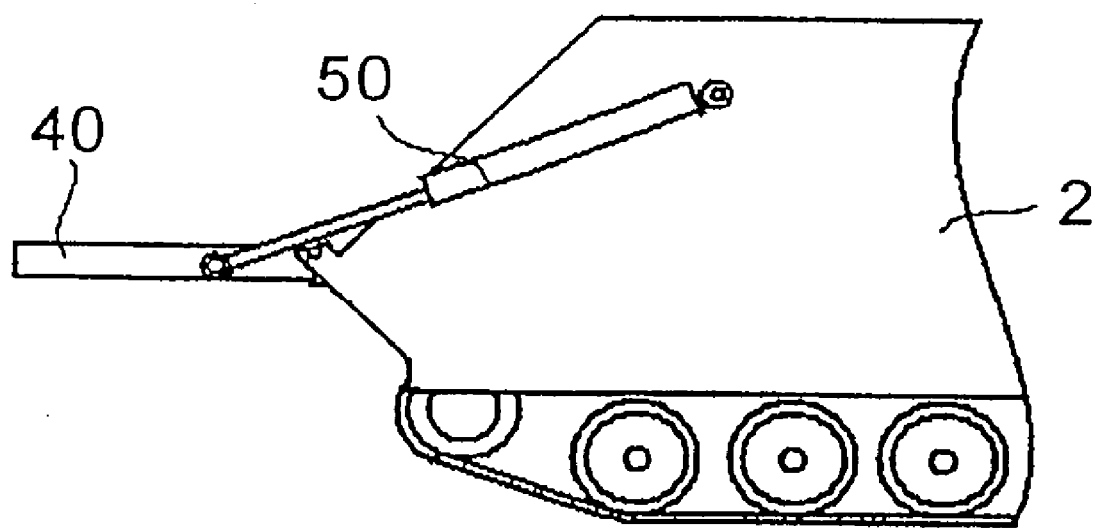
FIG. 16c is a view showing a standing-by state for vehicle maintenance of the AFIFD for the front surface.

FIG. 16 shows another embodiment of the present invention. In FIG. 16, the AFIFD 40, which has a triangular section and is attached on the front surface of the amphibious vehicle, is shown. In general, a trim vane unfolded during the swimming is mounted on the upper portion of the front surface. In the present invention, the front, upper, left and right armor plates serve as the trim vane, the air bag 49 (see FIG. 18) is inserted into the armor plates 41, 42, 43 and 44, and the armor plates respectively have the driving means. FIG. 16c shows AFIFD 40 for the front surface as folded state rotates to horizontal position by the driving means 50 for allowing a vehicle mechanic to put the vehicle in good order with open the door of engine room (not shown) of front surface of the vehicle.

Figure 17:
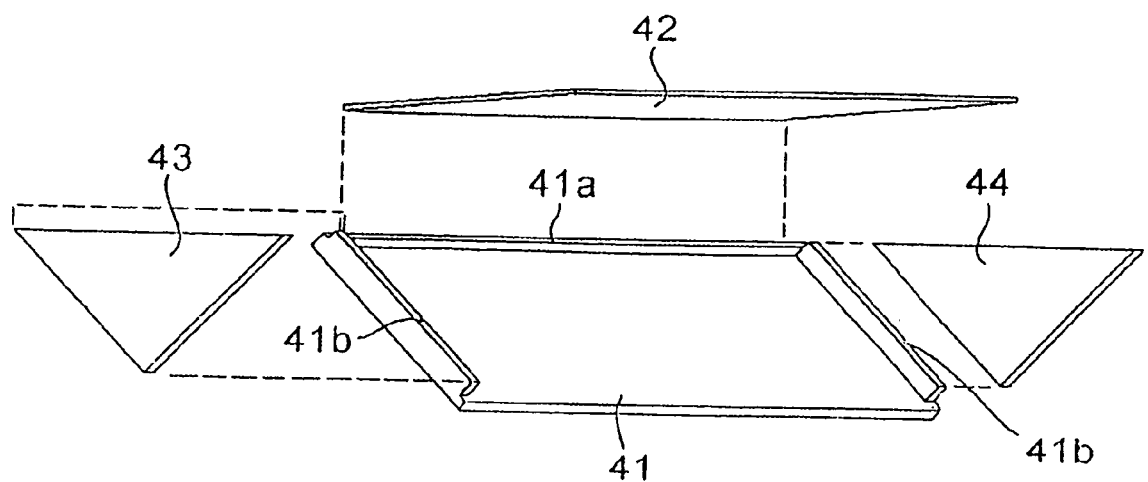
FIG. 17 is a structural view of armor plates of the AFIFD for the front surface.

FIG. 17 shows a rectangular front armor plate 41, of which the lower end edge is hinged to a front nose portion of the amphibious vehicle. The front armor plate 41 includes an edge 41a protruding from the upper end thereof like an angle in the from of an "L" shape, and edges 41b protruding from the right and left ends in the form of the "L" shape. An upper armor plate 42 is hinged to the upper end edge 41a of the front armor plate 41, and left and right armor plates 43 and 44 of an inverted triangular form are hinged to right and left edges 41b of the front armor plate 41. The air bag is inserted between the front and upper armor plates 41 and 42 (not shown). As shown in FIG. 17, the right and left edges 41b protrude more than the upper edge 41a. The reason is to fold the upper armor plate 42 hinged to the upper edge 41a to the front armor plate 41 faster than the right and left armor plates 43 and 44 hinged to the right and left edges 41b when the AFIFD is folded.

Figure 18:
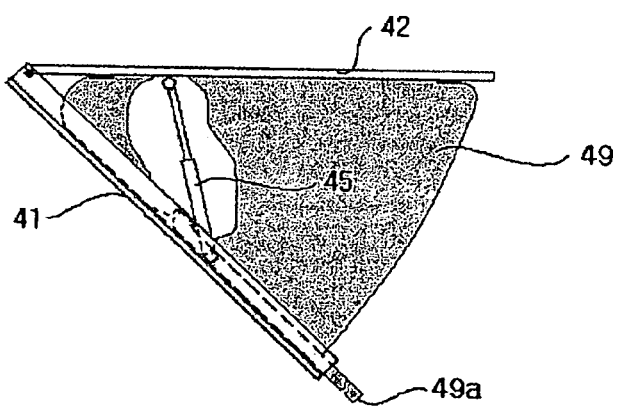
FIG. 18 is a view of an upper armor plate driving means of the AFIFD for the front surface.

The driving means for respectively operating the armor plates are mounted to fold and unfold the AFIFD. FIG. 16 shows an driving means 50 for connecting a predetermined portion of the right and left sides of the front armor plate and a predetermined portion of the side surface of the amphibious vehicle. The driving means 50 folds and unfolds the front armor plate. As shown in FIG. 18, an upper armor plate driving means 45 is connected to the central and lower end of the front armor plate 41 and the central and upper end of the upper armor plate 42. The driving means 45 passes through the inside of the air bag 49, and is connected to the predetermined portion of the front armor plate 41 and the upper armor plate 42. The air bag (rubber membrane bag) 49 has at least one connector 49a to provide air through.

Figure 19:
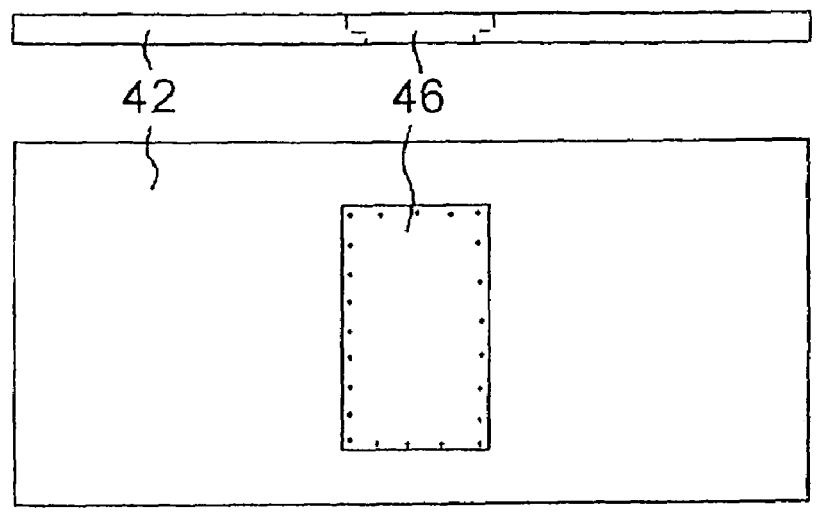
FIG. 19 is a structural view of an upper armor plate, which is a sectional accessory plate.

FIG. 19 shows the upper armor plate 42 having a sectional accessory plate 46, so that the driving means 45 can be assembled and disassembled.

Figure 20:
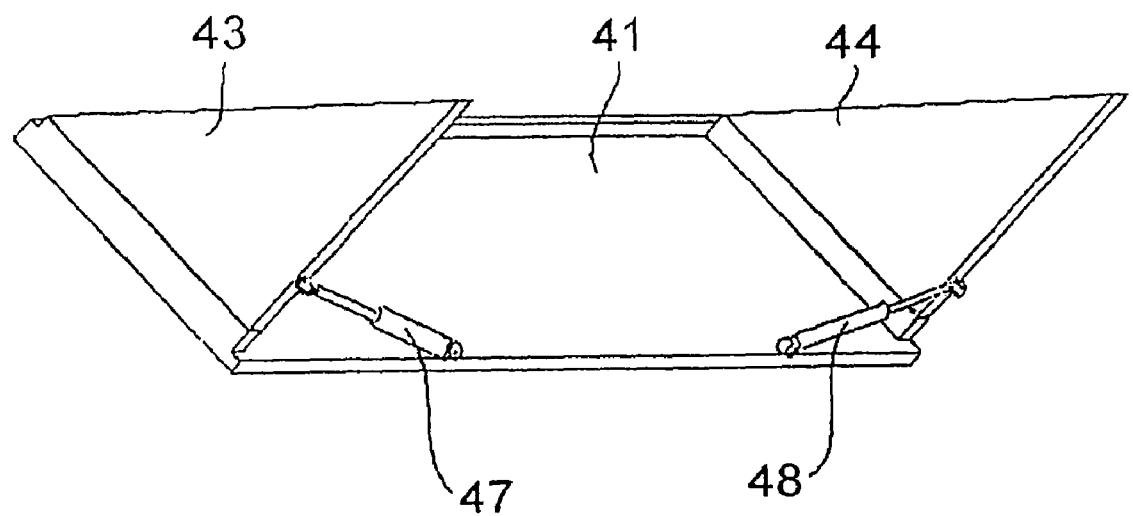
FIG. 20 is a view of right and left armor plates driving means according to the present invention.

As shown in FIG. 20, both ends of a left armor plate driving means 47 are connected to the left and lower end of the front armor plate 41 and the lower end of the left plate 43 of the inverted triangular shape. Both ends of a right armor plate driving means 48 are connected to the right and lower end of the front armor plate 41 and the lower end of the right armor plate 44 of the inverted triangular shape.

According to the structure of the AFIFD mounted on the front surface of the amphibious vehicle, the AFIFD acts as follows.

First, the inflatable AFIFD is folded and closely contacted to the upper part of the front surface of the vehicle body during the ground-running. However, the AFIFD is unfolded during the swimming of the amphibious vehicle as follows.

First, by the front armor plate driving means 50, the entire AFIFD is rotated forwardly on the hinge of the nose portion of the amphibious vehicle and moved to a forward inclined position(for example, at an angle of 60 degrees from the vertical line). After that, the left armor plate 43 and the right armor plate 44, which are folded on the upper armor plate 42, are rotated at a right angle by the driving means 47 and 48 and stand vertically. The upper armor plate 42 is unfolded upwardly by the driving means 45 and the air bag is filled with air and extended. Next, the front armor plate driving means 50 is somewhat pulled to the amphibious vehicle, so that the end of the upper armor plate 42 and the ends of the left and right armor plates 43 and 44 touch or nearly touch the whole upper part of the amphibious vehicle. As a result, the front surface, the top surface, the left surface and the right surface of the air bag are protected by each armor plate, and the rear surface of the air bag is protected by the upper portion of the front surface of the vehicle nose.

Through the above processes, the AFIFD is completely unfolded, and the driving means are fixed to maintain the unfolded condition. In the above condition, when the locking members(not shown) for fastening the upper armor plate 42 and the left and right armor plates 43 and 44 are coupled with the amphibious vehicle, the unfolding process is finished. Moreover, after the swimming, the AFIFD is folded and converted into a ground-running mode. The folding process is carried out in contrary to the unfold process.

INDUSTRIAL APPLICABILITY

As described above, when the AFIFD according to the present invention is mounted on the amphibious vehicle, which is short of buoyancy, the amphibious vehicle can float in water by receiving additional buoyancy through the AFIFD, so that the amphibious vehicle can rapidly swim in water under combat status and maximize fighting power by removing possibility of submersion by enemies' intimidation as it has protective power.

Particularly, the AFIFD according to the present invention can easily and rapidly convert the condition of the AFIFD, as it is folded for the swimming or unfolded for the ground-running by using pneumatic pressure by the air pump and the driving means, such as the winches or the actuators.

Moreover, by the cut portion 5a of the outer armor plate 5 to mount the space securing device of the driving means, the AFIFD can prevent interference between the driving means 18 and the outer armor plate 5 when the AFIFD is folded and unfolded, and secure the space for the driving means and prevent interference of the air bag when the outer armor plate 5 is folded to the inner plate 3.

Furthermore, by mounting the fabric membranes 31 or the ropes 33 for connecting the lower end of the inner plate 3 and the lower end of the outer armor plate 5, the AFIFD can be unfolded in structurally stable condition as the unfolded width of the outer armor plate 5 is restricted to locate the outer armor plate 5 at a right angle to the upper armor plate 4 when the AFIFD is unfolded.

Additionally, the AFIFD mounted on the front surface of the amphibious vehicle is additionally provided to provide greater buoyancy to the amphibious vehicle and improve buoyancy balance.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An amphibious vehicle having armoured inflatable floating devices (AFIFDs) for providing additional buoyancy during swimming, which are mounted on both outer sides thereof, the amphibious vehicle comprising:
   at least one wall closet-type connecting room corresponding to at least one connector protruding from a side of the AFIFD that contacts the amphibious vehicle in order to connect the amphibious vehicle with each AFIFD, the wall closet-type connecting room and the connector of the AFIFD forming a sealed space by being connected correspondingly to the connectors of the AFIFD, the wall closet-type connecting room being sunken inwardly from the outer side surface of the amphibious vehicle and being a corresponding area of the amphibious vehicle for installing a driving means for carrying out folding and unfolding actions of the AFIFD, so that the wall closet-type connecting room is closed at the upper and lower sides, the right and left sides and the inner side thereof and opened at the outer side thereof.

2. The amphibious vehicle according to claim 1, wherein the inner side of the wall closet-type connecting room is made of sectional plates having sealing means.

3. An AFIFD mounted on an amphibious vehicle for providing additional buoyancy to the amphibious vehicle, the AFIFD comprising:
   an inner plate attached to the outer side of the amphibious vehicle through at least one hinge and fixing means, the inner plate forming a first side surface of the AFIFD;
   an upper armor plate connected to the upper end of the inner plate by hinges to form the top surface of the AFIFD;
   an outer armor plate connected to the upper armor plate by hinges to form a second side surface of the AFIFD;
   a lower armor plate connected to the lower end of the inner plate and the outer armor plate by hinges to form the bottom surface of the AFIFD;
   a seal membrane for sealing gaps between two plates of the inner plate, the upper armor plate, the outer armor plate and the lower armor plate, the two plates being in contact with each other;
   front and rear thimble-type rubber membranes respectively located on the front and rear parts of the AFIFD, wherein the outer circumferences surrounding the ends of the thimble-type rubber membranes are bonded to corresponding parts of the inner plate, the upper armor plate, the outer armor plate and the lower armor plate;
   at least one connector mounted on the inner plate to provide air to the AFIFD;
   front and rear armor plates respectively connected to both ends of the inner plate by hinges for protecting the front and rear thimble-type rubber membranes, the front and rear armor plates respectively forming the front and rear surfaces of the AFIFD; and
   at least one driving means mounted between the upper armor plate and a corresponding part of the amphibious vehicle, the driving means carrying out folding and unfolding actions of the AFIFD,
   wherein the AFIFD further comprises one or more ropes connected to the lower end of the outer armor plate and at least one means for controlling the ropes,
   wherein, when the amphibious vehicle swims in water, the upper armor plate, the outer armor plate and the lower armor plate are completely unfolded by the driving means and pneumatic pressure, so that a sealed floating space is formed inside the AFIFD by the inner plate, the upper armor plate, the outer armor plate, the lower armor plate, and the front and rear thimble-type rubber membranes,
   wherein, when the amphibious vehicle does not swim in water, the upper armor plate, the outer armor plate and the lower armor plate are folded to the inner plate by the driving means and air suction and fixed by fixing means, and then the front and rear armor plates are closely folded and fixed to the folded upper armor plate, and
   wherein the AFIFD is lifted up by the driving means after the fixing means fixing the inner plate of the AFIFD to the outer side of the amphibious vehicle are unfastened.

4. An AFIFD mounted on an amphibious vehicle for providing additional buoyancy to the amphibious vehicle, the AFIFD comprising:
   an inner plate attached to the outer side of the amphibious vehicle through at least one hinge and fixing means, the inner plate forming a first side surface of the AFIFD;
   an upper armor plate connected to the upper end of the inner plate by hinges to form the top surface of the AFIFD;
   an outer armor plate connected to the upper armor plate by hinges to form a second side surface of the AFIFD;
   a lower armor plate connected to the lower end of the inner plate and the outer armor plate by hinges to form the bottom surface of the AFIFD;
   a rubber membrane bag having a sealed space which has a shape and a size suitable for the inner shape of the unfolded armor plates and at least one connector for providing air to the sealed space, the rubber membrane bag being partially bonded to main points of the armor plates to allow the folding and unfolding actions of the AFIFD;
   front and rear armor plates respectively connected to both ends of the inner plate by hinges for protecting the front and rear parts of the rubber membrane bag, the front and rear armor plates respectively forming the front and rear surfaces of the AFIFD; and at least one driving means mounted on the upper armor plate, the driving means carrying out folding and unfolding actions of the AFIFD, wherein the AFIFD further comprises one or more ropes connected to the lower end of the outer armor plate and at least one means for controlling the ropes, wherein, when the amphibious vehicle swims in water, the upper armor plate, the outer armor plate and the lower armor plate are completely unfolded by the driving means and pneumatic pressure, so that a sealed floating space is formed inside the AFIFD by the rubber membrane bag, wherein, when the amphibious vehicle does not swim in water, the upper armor plate, the outer armor plate and the lower armor plate, together with the deflated rubber membrane bag, are folded to the inner plate by the driving means and air suction and fixed by fixing means, and then the front and rear armor plates are closely folded and fixed to the folded upper armor plate, and wherein the AFIFD is lifted up by the driving means after the fixing means fixing the inner plate of the AFIFD to the outer side of the amphibious vehicle are unfastened.

5. The AFIFD according to claim 4, wherein the lower armor plate is made of multiple strips longitudinally elongated and hinged with each other in a bendable manner.

6. An AFIFD mounted on an amphibious vehicle for providing additional buoyancy to the amphibious vehicle, the AFIFD comprising:

an inner plate attached to the outer side of the amphibious vehicle through at least one hinge and fixing means, the inner plate forming a first side surface of the AFIFD;

an upper armor plate connected to the upper end of the inner plate by hinges to form the top surface of the AFIFD;

an outer armor plate connected to the upper armor plate by hinges to form a second side surface of the AFIFD;

a fabric membrane connected to the lower end of the inner plate and the lower end of the outer armor plate to form a lower side of the AFIFD;

a rubber membrane bag having a sealed space which has a shape and a size suitable for the inner shape of the unfolded armor plates and at least one connector for providing air to the sealed space, the rubber membrane bag being partially bonded to main points of the armor plates to allow the folding and unfolding actions of the AFIFD;

front and rear armor plates respectively connected to both ends of the inner plate by hinges for protecting the front and rear parts of the rubber membrane bag, the front and rear armor plates respectively forming the front and rear surfaces of the AFIFD; and at least one driving means mounted on the upper armor plate, the driving means carrying out folding and unfolding actions of the AFIFD, wherein the AFIFD further comprises one or more ropes connected to the lower end of the outer armor plate and at least one means for controlling the ropes, wherein, when the amphibious vehicle swims in water, the upper armor plate, the outer armor plate and the fabric membrane are completely unfolded by the driving means and pneumatic pressure, so that a sealed floating space is formed inside the AFIFD by the rubber membrane bag, wherein, when the amphibious vehicle does not swim in water, the upper armor plate, the outer armor plate, and the fabric membrane, together with the deflated rubber membrane bag, are folded to the inner plate by the driving means and air suction and fixed by fixing means, and then the front and rear armor plates are closely folded and fixed to the folded upper armor plate, and wherein the AFIFD is lifted up by the driving means after the fixing means fixing the inner plate of the AFIFD to the outer side of the amphibious vehicle are unfastened.

7. An AFIFD mounted on an amphibious vehicle for providing additional buoyancy to the amphibious vehicle, the AFIFD comprising:

an inner plate attached to the outer side of the amphibious vehicle through at least one hinge and fixing means, the inner plate forming a first side surface of the AFIFD;

an upper armor plate connected to the upper end of the inner plate by hinges to form the top surface of the AFIFD;

at least one driving means mounted on the upper armor plate, the driving means carrying out folding and unfolding actions of the AFIFD;

an outer armor plate connected to the upper armor plate by hinges to form a second side surface of the AFIFD, wherein a portion of the outer armor plate is in the state of being cut, the cut portion being corresponding to a portion of the upper armor plate to which the driving means is attached in case that the outer armor plate is folded to the upper armor plate;

a fabric membrane connected to the lower end of the inner plate and the lower end of the outer armor plate to form a lower portion of the AFIFD;

a rubber membrane bag having a sealed space which has a shape and a size suitable for the inner shape of the unfolded armor plates and at least one connector for providing air to the sealed space, the rubber membrane bag being partially bonded to main points of the armor plates to allow the folding and unfolding actions of the AFIFD; and front and rear armor plates respectively connected to both ends of the inner plate by hinges for protecting the front and rear parts of the rubber membrane bag, the front and rear armor plates respectively forming the front and rear surfaces of the AFIFD, wherein the AFIFD further comprises one or more ropes connected to the lower end of the outer armor plate and at least one means for controlling the ropes, wherein the AFIFD further comprises means for securing a space of the driving means by moving a part of the rubber membrane bag as the outer armor plate is folded to the inner plate, in order to secure the space of the driving means and to prevent interference between the driving means and the rubber membrane bag when the outer armor plate is folded, wherein, when the amphibious vehicle swims in water, the upper armor plate, the outer armor plate and the fabric membrane are completely unfolded by the driving means and pneumatic pressure, so that a sealed floating space is formed inside the AFIFD by the rubber membrane bag, wherein, when the amphibious vehicle does not swim in water, the upper armor plate, the outer armor plate and the fabric membrane, together with the deflated rubber membrane bag, are folded to the inner plate by the driving means and air suction and fixed by fixing means, and then the front and rear armor plates are closely folded and fixed to the folded upper armor plate, and wherein the AFIFD is lifted up by the driving means after the fixing means fixing the inner plate of the AFIFD to the outer side of the amphibious vehicle are unfastened.

8. The AFIFD according to claim 6 or 7, wherein a fabric hardening portion is partially formed on the fabric membrane, the fabric hardening portion having a property of not being bent or broken in free condition in order to prevent the fabric membrane and the rubber membrane bag from being inserted into gaps of the AFIFD.

9. The AFIFD according to claim 7, wherein the means for securing a space of the driving means includes:

ropes for connecting right and left sides of the cut portion of the outer armor plate to the inner plate, respectively, each rope having a ring formed on the end connected with the outer armor plate; and rope connecting members located at right and left sides of the cut portion of the outer armor plate, the rope connecting members allowing the rings to slide in direction that the rings becomes closer to the cut portion along the surface of the outer armor plate, wherein the rings slide to the cut portion of the outer armor plate as the outer armor plate is folded, so that a portion of the rubber membrane bag around the cut portion is pulled toward the cut portion so as to secure the space for the driving means.

10. An AFIFD mounted on an amphibious vehicle for providing additional buoyancy to the amphibious vehicle, the AFIFD comprising:

an inner plate attached to the outer side of the amphibious vehicle through at least one hinge and fixing means, the inner plate forming a first side surface of the AFIFD;

an upper armor plate connected to the upper end of the inner plate by hinges, the upper armor plate serving both as the top surface and the outer surface of the AFIFD by being slantedly unfolded;

a seal membrane for sealing between the inner plate and the upper armor plate being in contact with each other;

rubber membrane integrally forming the front, rear and lower surfaces of the AFIFD, in which portions contacting the inner plate and the upper armor plate are bonded with each plate respectively;

at least one connector mounted on the inner plate to provide air to the AFIFD;

front and rear armor plates respectively connected to both ends of the inner plate by hinges for protecting the front and rear surfaces of the rubber membrane, the front and rear armor plates respectively forming the front and rear surfaces of the AFIFD; and at least one driving means mounted on the upper armor plate, the driving means carrying out folding and unfolding actions of the AFIFD, wherein, when the amphibious vehicle swims in water, the upper armor plate is slantedly unfolded in a downward direction by the driving means and pneumatic pressure, so that the inner plate and the rubber membrane form a sealed floating space inside the AFIFD, wherein, when the amphibious vehicle does not swim in water, the integrally formed rubber membrane is folded between the inner plate and the upper armor plate by the driving means and air suction and fixed by fixing means, and then the front and rear armor plates are closely folded and fixed to the folded upper armor plate, and wherein the AFIFD is lifted up by the driving means after the fixing means fixing the inner plate of the AFIFD to the outer side of the amphibious vehicle are unfastened.

11. An AFIFD mounted on an amphibious vehicle for providing additional buoyancy to the amphibious vehicle, the AFIFD comprising:

an inner plate attached to the outer side of the amphibious vehicle through at least one hinge and fixing means, the inner plate forming a first side surface of the AFIFD;

an upper armor plate connected to the upper end of the inner plate by hinges, the upper armor plate serving both as the top surface and the outer surface of the AFIFD by being slantedly unfolded;

a rubber membrane bag having a sealed space which has a shape and a size suitable for the inner shape of the unfolded armor plates and at least one connector for providing air to the sealed space, the rubber membrane bag being partially bonded to main points of the armor plates to allow the folding and unfolding actions of the AFIFD;

front and rear armor plates respectively connected to both ends of the inner plate by hinges for protecting the front and rear parts of the rubber membrane bag, the front and rear armor plates respectively forming the front and rear surfaces of the AFIFD; and at least one driving means mounted on the upper armor plate, the driving means carrying out folding and unfolding actions of the AFIFD, wherein, when the amphibious vehicle swims in water, the upper armor plate is slantedly unfolded in a downward direction by the driving means and pneumatic pressure, so that a sealed floating space is formed inside the AFIFD by the rubber membrane bag, wherein, when the amphibious vehicle does not swim in water, the deflated rubber membrane bag is folded between the inner plate and the upper armor plate by the driving means and air suction and fixed by fixing means, and then the front and rear armor plates are closely folded and fixed to the folded upper armor plate, and wherein the AFIFD is lifted up by the driving means after the fixing means fixing the inner plate of the AFIFD to the outer side of the amphibious vehicle are unfastened.

12. An AFIFD mounted on the front surface of an amphibious vehicle for providing additional buoyancy to the amphibious vehicle, the AFIFD comprising:

a front armor plate having a lower end edge hinged to a nose portion of the front surface;

an upper armor plate hinged to an edge protruding in the form of an "L" shape on the upper end of the front armor plate;

inverted triangle-type left and right armor plates respectively hinged with protrusions on the left and right sides of the front armor plate, the protrusions being more protruding than the protruding edge of the upper end of the front armor plate;

a rubber membrane bag located within the space between the front armor plate and the upper armor plate and having a sealed space which has a shape and a size suitable for an inner shape formed when the front armor plate and the upper armor plate are completely unfolded and at least one connector for providing air to the sealed space, the rubber membrane bag being partially bonded to main points of the armor plates to allow the folding and unfolding actions of the AFIFD;

a driving means for operating the front armor plate;

an upper armor plate driving means mounted inside the rubber membrane bag, both ends of the driving means attached to the central and lower end of the front armor plate and the central and upper end of the upper armor plate respectively; and at least one side plate driving means mounted on each side to operate the left and right armor plates.

13. The AFIFD according to any one of claims 3 to 7, wherein said at least one connector is an extensible connector, and both ends of the driving means are respectively mounted on the corresponding connected portion of the amphibious vehicle and the upper armor plate through the extensible connector.

* * * * *